US012475401B2

(12) United States Patent
Amaro et al.

(10) Patent No.: US 12,475,401 B2
(45) Date of Patent: Nov. 18, 2025

(54) QUANTUM COMPUTER SYSTEM AND METHOD FOR COMBINATORIAL OPTIMIZATION

(71) Applicant: Quantinuum Ltd, London (GB)

(72) Inventors: David Amaro, London (GB); Carlo Modica, London (GB); Marcello Benedetti, Vilnius (LT); Mattia Fiorentini, London (GB); Michael Lubasch, London (GB); Matthias Rosenkranz, London (GB)

(73) Assignee: Quantinuum Ltd, London (GB)

( * ) Notice: Subject to any disclaimer, the term of this patent is extended or adjusted under 35 U.S.C. 154(b) by 665 days.

(21) Appl. No.: 17/825,908

(22) Filed: May 26, 2022

(65) Prior Publication Data

US 2022/0391742 A1 Dec. 8, 2022

(30) Foreign Application Priority Data

May 26, 2021 (GB) .................................. 2107468

(51) Int. Cl.
*G06N 10/60* (2022.01)
*G06N 10/20* (2022.01)
*G06N 10/80* (2022.01)

(52) U.S. Cl.
CPC ............. *G06N 10/60* (2022.01); *G06N 10/20* (2022.01); *G06N 10/80* (2022.01)

(58) Field of Classification Search
CPC ......... G06N 10/60; G06N 10/20; G06N 10/80
See application file for complete search history.

(56) References Cited

U.S. PATENT DOCUMENTS

| 2018/0259559 A1* | 9/2018 | Humphrey | G01R 23/16 |
| 2019/0164079 A1* | 5/2019 | Gambetta | G06N 10/60 |
| 2020/0372094 A1* | 11/2020 | Shehab | G06N 10/60 |
| 2022/0383177 A1* | 12/2022 | Alcazar | G06N 10/40 |
| 2023/0237361 A1* | 7/2023 | Cowtan | G06N 5/01 |
| | | | 706/62 |

OTHER PUBLICATIONS

Amaro et al., Feb. 10, 2022, Filtering variational quantum algorithms for combinatorial optimization, arXiv:2106.10055v3, [quant-ph], 14 pp.

(Continued)

*Primary Examiner* — Nghia M Doan
(74) *Attorney, Agent, or Firm* — KNOBBE, MARTENS, OLSON & BEAR, LLP

(57) ABSTRACT

A computing system including one or more classical binary computers coupled to one or more quantum computers. The computing system is configured to process the one or more computing tasks including at least one combinatorial optimization task using a Filtering Variational Quantum Eigensolver (F-VQE) algorithm implemented by using one or more Ansätze circuits and a cost function arrangement to generate one or more quantum circuits in the quantum computer. The computing system iteratively applies a filtering operator to a cost function arrangement to generate a corresponding filtered cost function arrangement that excludes energy states that exceed an energy threshold and uses the filtered cost function arrangement in the one or more quantum circuits to generate output results.

22 Claims, 10 Drawing Sheets

(56) References Cited

OTHER PUBLICATIONS

Alcazar J. et al., Enhancing Combinatorial Optimization with Quantum Generative Model, (2021), arXiv:2101.06250 [quant-ph].
Bañuls, M.C. et al., Entanglement And Its Relation to Energy Variance for Local One-Dimensional Hamiltonians, Phys. Rev. B, vol. 101, 144305 (2020).
Barkoutsos, P. K. et al., Improving Variational Quantum Optimization Using CVaR, arXiv:1907.04769v3 (2020). (also published in Quantum, vol. 4, No. 256. 2020).
Benedetti, M. et a., Parameterized Quantum Circuits as Machine Learning Models, arXiv:1906.07682v2 (2019). (also published in Quantum Sci. Technol. 4, 043001, 2019).
Benedetti, M. et al., Hardware-Efficient Variational Quantum Algorithms for Time Evolution, Physical Review Research, vol. 3, 033083 (2021).
Berman, P. et al., On Some Tighter Inapproximability Results (Extended Abstract), In Automata, Languages and Programming, Edited by J. Wiedermann, P. Van Emde Boas, and M. Nielsen (Springer Berlin Heidelberg, Berlin, Heidelberg, pp. 200-209 (1999).
Bharti, K. et al., Noisy Intermediate-Scale Quantum (NISQ) algorithms, (2021), arXiv:2101.08448 [quant-ph].
Bravo-Prieto, C. et al., Quantum Singular Value Decomposer, arXiv:2002.06210v4 (2020). (also published in Physical Review A, vol. 101, 062310, 2020).
Bravo-Prieto, C. et al., Scaling of Variational Quantum Circuit Depth for Condensed Matter Systems, arXiv:2002.06210v4 (2020). (also published in Quantum, vol. 4, No. 272, 2020).
Cakan, A. et al., Approximating the Long Time Average of the Density Operator: Diagonal Ensemble, arXiv:2011.01257v1 (2021). (also published in Phys. Rev. B 103, 115113, 2021).
Cao, C. et al., Noise-Assisted Quantum Autoencoder, arXiv:2012.08331v2, (2021). (also published in Physical Review Applied, vol. 15, 054012, 2021).
Cerezo, M. et al., Cost Function Dependent Barren Plateaus in Shallow Parametrized Quantum Circuits, arXiv:2001.00550v3 (2021). (also published in Nature Communications, vol. 12, No. 1791, 2021).
Cerezo, M. et al., Variational Quantum Algorithms, arXiv:2012.09265v2 (2021). (also published in Nature Reviews Physics, vol. 3, No. 625, 2021).
Chertkov, E. et al., Holographic Dynamics Simulations with a Trapped Ion Quantum Computer, (2021), arXiv:2105.09324 [quant-ph].
Cirac, J. I. et al., Matrix Product States and Projected Entangled Pair States: Concepts, Symmetries, Theorems, arXiv:2011.12127v2 (2021). (also published in Reviews of Modern Physics, vol. 93, 045003, 2021).
Dalgaard, M. et al., Hessian-Based Optimization of Constrained Quantum Control, Physical Review A, vol. 102, 042612 (2020).
Diez-Valle, P. et al., Quantum Variational Optimization: The Role of Entanglement and Problem Hardness, arXiv:2103.14479v2, (2021). (also published in Physical Review A, 104, 062426, 2021).
Du, Y. et al., Quantum Circuit Architecture Search: Error Mitigation and Trainability Enhancement for Variational Quantum Solvers, arXiv:2010.10217v2 [quant-ph] (2020).
Farhi E. et al., Quantum Supremacy Through the Quantum Approximate Optimization Algorithm, arXiv:1602.07674 v2 [quant-ph] (2019).
Farhi, E. et al., A Quantum Adiabatic Evolution Algorithm Applied to Random Instances of An NP-Complete Problem, arXiv:quant-ph/0104129v1 (2021). (also published in Science, vol. 292, No. 472, 2001).
Farhi, E. et al., A Quantum Approximate Optimization Algorithm, (2014), arXiv:1411.4028 [quant-ph].
Fernandez-Lorenzo, S. et al., Hybrid quantum—Classical Optimization with Cardinality Constraints and Applications to Finance, arXiv:2008.12050v2 (2021). (also published in Quantum Sci. Technol. 6 034010, 2021).

Foss-Feig, M. et al., Entanglement from Tensor Networks on a Trapped-Ion QCCD Quantum Computer, arXiv:2104.11235 [quant-ph] (2021).
Foss-Feig, M. et al., Holographic Quantum Algorithms for Simulating Correlated Spin Systems, Physical Review Research, vol. 3, 033002 (2021).
Garcia-Saez A. et al., Addressing Hard Classical Problems with Adiabatically Assisted Variational Quantum Eigensolvers, arXiv:1806.02287 [quant-ph] (2018).
Ge, Y. et al., Faster Ground State Preparation and High-Precision Ground Energy Estimation with Fewer qubits, arXiv:1712.03193v2 (2019). (also published in Journal of Mathematical Physics, vol. 60, 022202, 2019).
Glover, F. et al., Quantum Bridge Analytics I: A Tutorial on Formulating and using QUBO models, Computer Science, Data Structures and Algorithms, 4OR 17, 335 (2019).
Grimsley, H. R. et al., An Adaptive Variational Algorithm for Exact Molecular Simulations on a Quantum Computer, Nature Communications, vol. 10, 3007 (2019).
Hadfield, S. et al., From the Quantum Approximate Optimization Algorithm to a Quantum Alternating Operator Ansatz, arXiv:1709.03489v2 (2019). (also published in Algorithms, vol. 12, No. 34, 2019).
Harrigan, M. P. et al., Quantum Approximate Optimization of Non-Planar Graph Problems On A Planar Superconducting Processor, arXiv:2004.04197v3 (2021). (also published in Nature Physics, vol. 17, No. 332, 2021).
Hastad, J., Some Optimal Inapproximability Results, Journal of the ACM, vol. 48, No. 4., pp. 798-859 (2001).
Helmberg, C., Semidefinite Programming For Combinatorial Optimization, 2000.
Kadowaki T. et al., Quantum Annealing in the Transverse Ising Model, arXiv:cond-mat/9804280v1 (1998). (also published in Physical Review, vol. 58, 5355, 1998).
Kirkpatrick, S. et al., Optimization By Simulated Annealing, Science, vol. 220, No. 4598, 1983.
Kochenberger, G. et al., The Unconstrained Binary Quadratic Programming Problem: A Survey, Journal of Combinatorial Optimization, vol. 28, Issue 1, pp. 58-81, 2014.
Kolotouros I. et al., An Evolving Objective Function For Improved Variational Quantum Optimization, (2021), arXiv:2105.11766 [quant-ph].
Korte B. et al., Combinatorial Optimization: Theory and Algorithms, 6th ed. (Springer Publishing Company, Incorporated, 2018).
Kyriienko, O. et al., Quantum Inverse Iteration Algorithm For Programmable Quantum Simulators, npj Quantum Information, vol. 6, No. 7 (2020).
Trefethen L.N. et al., Numerical Linear Algebra, SIAM (Society for Industrial and Applied Mathematics) Philadelphia, 1997.
LaRose, R. et al., Mixer-phaser Ansatze for Quantum Optimization with Hard Constraints, (2021), arXiv:2107.06651 [quant-ph].
Liu, X. et al., Layer VQE: A Variational Approach For Combinatorial Optimization On Noisy Quantum Computers, (2021), arXiv:2102.05566v1 [quant-ph].
Lu, S. et al., Algorithms For Quantum Simulation at Finite Energies, (2020), arXiv:2006.03032v2 [quant-ph].
Lubasch, M. et al., Multigrid Renormalization, Journal of Computational Physics, vol. 372, 587,2018.
Lubasch, M. et al., Systematic Construction of Density Functionals Based on Matrix Product State Computations, New Journal of Physics, vol. 18, 083039 (2016).
Lucas, A., Ising Formulations of Many NP Problems, arXiv:1302.5843v3 (2014). (also published in Frontiers in Physics, vol. 2, No. 5, 2014).
Majumdar, R. et al., Depth Optimized Ansatz Circuit in QAOA for Max-Cut, (2021), arXiv:2110.04637 [quant-ph].
Mari, A. et al., Estimating the Gradient and Higher-Order Derivatives on Quantum Hardware, arXiv:2008.06517v2 (2021. (also published in Physical Review A, vol. 103, 012405, 2021).
Mitarai, K. et al., Quantum Circuit Learning, [arXiv:1803.00745v3] (2018). (also published in Phys. Rev. A 98, 032309, 2018).

(56) References Cited

OTHER PUBLICATIONS

Moll, N. et al., Quantum Optimization Using Variational Algorithms on Near-Term Quantum Devices, [arXiv:1710.01022v2 (2018). (also published in Quantum Science and Technology, vol. 3, 030503, 2018).

Moussa, C. et al., To Quantum or Not to Quantum: Towards Algorithm Selection in Near-Term Quantum Optimization, arXiv:2001.08271v2 (2020). (also published in Quantum Science and Technology, vol. 5, 044009, 2005).

Noble, J. et al., Diagonalization of Complex Symmetric Matrices: Generalized Householder Reflections, Iterative Deflation and Implicit Shifts, Computational Physics Communication, vol. 221, No. 304 (2017).

Noble, J. et al., Generalized Householder Transformations for the Complex Symmetric Eigenvalue Problems, arXiv:1301.5758v3 (2012). (also published in The European Physical Journal Plus, vol. 128, No. 93, 2013).

Ostaszewski, M. et al., Structure optimization for parameterized quantum circuits, arXiv:1905.09692v3 (2012). (also published in Quantum, vol. 5, No. 391, 2021).

Ostaszewski, M. et al., Reinforcement learning for optimization of variational quantum circuit architectures, arXiv:2103.16089 [quant-ph] (2012).

Orus, R., A practical introduction to tensor networks: Matrix product states and projected entangled pair states, arXiv:1306.2164v2 (2014). (also published in Annals of Physics, vol. 349, No. 117, 2014).

Patti, T. L. et al., Variational Quantum Optimization with Multi-Basis Encodings, (2022), arXiv:2106.13304 [quant-ph].

Peruzzo, A. et al., A Variational Eigenvalue Solver on a Photonic Quantum Processor, arXiv:1304.3061v1 (2013). (also published in Nature Communications, vol. 5, No. 4213, 2014).

Pino, J. M. et al., Demonstration of the Trapped-Ion Quantum CCD Computer Architecture, arXiv:2003.01293v4 (2021). (also published in Nature, vol. 592, No. 209, 2021).

Romero, J. et al., Quantum Autoencoders for Efficient Compression of Quantum Data, Quantum Science and Technology, vol. 2, 045001 (2017).

Rothman, D. H., Large Near-Surface Anomalies, Seismic Reflection Data, and Simulated Annealing. SEP-45, (Ph.D. thesis, Stanford University, 1985).

Saleem, Z. H. et al., Quantum Divide and Conquer for Combinatorial Optimization and Distributed Computing, arXiv:2107.07532 [quant-ph] (2021).

Schuld, M. et al., Evaluating Analytic Gradients on Quantum Hardware, Physical Review A, vol. 99, 032331 (2019).

Sivarajah, S. et al., t|ket>: A Retargetable Compiler for NISQ devices, arXiv:2003.10611v3 (2020). (also published in Quantum Science and Technology, vol. 6, 014003, 2020).

Skolik, A. et al., Layerwise Learning for Quantum Neural Networks, Quantum Machine Intelligence, vol. 3, No. 5 (2021).

Sweke, R. et al., Stochastic Gradient Descent For Hybrid Quantum-Classical Optimization, arXiv:1910.01155v3 (2020). (also published in Quantum, vol. 4, No. 314, 2020).

Vidal, G., Class of Quantum Many-Body States that can Be Efficiently Simulated, arXiv:quant-ph/0610099v1 (2008). (also published in Physical Review Letters, vol. 101, 110501, 2008).

Wecker, D. et al., Progress Towards Practical Quantum Variational Algorithms, Physical Review A, vol. 92, 042303 (2015).

Weiße, A. et al., The Kernel Polynomial Method, arXiv:cond-mat/0504627v2 (2006). (also published in Reviews of Modern Physics, vol. 78, No. 275, 2006).

Wiersema, R. et al., Exploring Entanglement and Optimization within The Hamiltonian Variational Ansatz, arXiv:2008.02941v2 (2020). (also published in PRX Quantum, vol. 1, 020319, 2020).

Yang, Y. et al., Probing Thermalization Through Spectral Analysis with Matrix Product Operators, arXiv:1909.01398v1 (2020). (also published in Phys. Rev. Lett. 124, 100602, 2020).

Zeng, P. et al., Universal quantum algorithmic cooling on a quantum computer, arXiv:2109.15304v1 [quant-ph] (2021).

Zhang, S. X. et al., Variational Quantum-Neural Hybrid Eigensolver, arXiv:2106.05105 [quant-ph] (2021).

Zhou, L. et al., Quantum Approximate Optimization Algorithm: Performance, Mechanism, And Implementation On Near-Term Devices, Physical Review X, vol. 10, 021067 (2020).

Zhu, L. et al., An Adaptive Quantum Approximate Optimization Algorithm for Solving Combinatorial Problems on a Quantum Computer, arXiv:2005.10258v3 [quant-ph] (2020).

Garcia-Ripoll, J. J., et al., Quantum-Inspired Algorithms for Multivariate Analysis: From Interpolation to Partial Differential Equations, arXiv:1909.06619v5 (2021) (also published in Quantum, vol. 5, p. 431, (2021).

Amaro, D. et al., A case study of variational quantum algorithms for a job shop scheduling problem arXiv:2109.03745v1 [quant-ph] (2021).

\* cited by examiner

QUANTUM COMPUTER SYSTEM AND METHOD FOR COMBINATORIAL OPTIMIZATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of the Invention

The present disclosure relates to computing systems that are configured to use quantum computing arrangements therein. Moreover, the present disclosure also relates to methods for (namely, methods of) configuring aforesaid computing systems. Furthermore, the present disclosure relates to software products that are executable on computing hardware to configure and use aforesaid computing systems.

Description of the Related Art

Quantum computers are configured to use quantum circuits to manipulate qubits, wherein the quantum circuits use quantum operators such as Hadamard transforms and entanglements. Moreover, the quantum computers are used in combination with classical binary computers that configure the quantum computers, prepare data to feed into the quantum computers and process qubit measurement results generated by the quantum computers. For example, classical binary computers are beneficially used to provide a user interface through which a given user interacts with the quantum computers.

Quantum computers can be effective at solving combinatorial optimization problems, for example by using Variational Quantum Eigensolvers (VQE) and Quantum Approximate Optimization Algorithms (QAOA). Such optimization problems relate, for example, to configuring complex real-life systems to function more reliably and efficiently, for example in a more energy-efficient manner. Applications of such combinatorial optimization include finding a shortest route via several locations for a delivery service, making optimal use of available storage space in logistics, and optimizing a manufacturing supply chain to increase a factory's productivity. Moreover, it has been appreciated that various sectors in industry and research would be beneficially enhanced if quantum computers executing quantum algorithms were able to solve optimization problems (e.g., combinatorial optimization problems) faster and/or better than classical computers.

SUMMARY

The present disclosure seeks to provide improved computing systems that are more effective and efficient when performing combinatorial optimization tasks, for example when controlling or monitoring complex real systems, for example to reduce waste and to improve an efficiency of energy utilization occurring within the complex real systems. Moreover, the present disclosure seeks to provide computing systems including one or more quantum computers that are less prone to computational errors when performing computations. Furthermore, the present disclosure seeks to provide improved methods for configuring and operating (namely using) aforesaid computing systems.

According to a first aspect, there is provided a computing system including one or more classical binary computers coupled to one or more quantum computers, where the one or more classical binary computers are configured to receive one or more computing tasks via an input port and to output corresponding computational results via an output port. The one or more quantum computers are configured to execute one or more quantum circuits that are generated from the one or more tasks to generate corresponding output results for the one or more classical binary computers to use to generate the corresponding computational results. The computing system is configured to process the one or more computing tasks including at least one combinatorial optimization task using a Variational Quantum Eigensolver (VQE) algorithm implemented by using one or more Ansätze circuit and a cost function arrangement to generate the one or more quantum circuits. The computing system is configured to apply iteratively a filtering operator to the cost function arrangement to generate a corresponding filtered cost function arrangement of a Filtering Variation Quantum Eigensolver (F-VQE) algorithm that excludes one or more energy states of the cost function arrangement that exceed an energy threshold and retains one or more energy states of the cost function arrangement that are below the energy threshold, wherein the filtered cost function arrangement is used in the one or more quantum circuits to generate the output results.

The computing system is of advantage in that configuring the one or more quantum circuits using a Filtering Variational Quantum Eigensolver (F-VQE) algorithm, enables the one or more quantum circuits to solve the one or more tasks more efficiently and with a lower computational error rate. In some cases, the F-VQE may comprise a filtering operator that increases the overlap between a quantum state included in the one or more quantum circuits, and a quantum ground state, so that the one or more quantum circuits can converge faster and more efficiently to an optimal solution for the corresponding problem (e.g., a combinatorial optimization problem).

It will be appreciated that an Ansatz (e.g., Ansatz circuit) used in configuring the one or more quantum circuits determines a structure of the one more quantum circuits, while the cost function arrangement determines the gate/circuit parameters of the one or more quantum circuits.

Optionally, in the computing system, the cost function arrangement includes one or more Hamiltonians representative of a real physical system. In some cases, the cost function arrangement may be associated with an average energy (e.g., an expectation value) estimated based on a Hamiltonian (e.g., a Hamiltonian representing a physical system or the problem) and a parametrized quantum circuit Ansatz.

Optionally, in the computing system, the one or more classical binary computers are configured to compute one or more causal cones that are representative of one or more principal computation paths within the one or more quantum circuits that contribute to the output results, and wherein the one or more classical binary computers are configured to omit one or more parts of the one or more quantum circuit whose contribution to the output results are below a threshold value. In some cases, the one or more parts the one or more quantum circuits may include qubits and gates in the ansatz circuit that have no effect or nearly no effect o the expectation value of the corresponding filtering operators.

More optionally, in the computing system, omitting the one or more parts corresponds to a reduction in a number of qubits required to implement the one or more quantum circuits.

More optionally, in the computing system, omitting the one or more parts corresponds to a reduction in circuit depth of the one or more quantum circuits.

Optionally, in the computing system, a repeated action of the filtering operator on an initial quantum state projects out high-energy eigenstates and generates a resulting quantum state having larger overlap with the ground state. In some embodiments, the high energy eigen states correspond to sub-optimal solutions to a combinatorial optimization task implemented in the corresponding quantum circuits.

Optionally, the computing system is configured to compute a stochastic gradient descent when applying the filtering operator to the cost function arrangement to reduce a number of optimization steps required for generating the filtered cost function arrangement, to avoid local minima when optimizing the F-VQE algorithm. FVQE addresses the problem of reducing the number of optimization steps required by approximating and learning the filtering operator by using a Parameterized Quantum Circuit whose optimal approximation parameters are learned via Stochastic Gradient Descent. Such an approach makes FVQE implementable and successful on contemporary NISQ quantum computers.

In some embodiments, the filtering operator may comprise an approximate filtering operator. The use of the approximate filtering operator for increasing the overlap of a quantum state used in a quantum circuit, may reduce one or more constrains on the quantum hardware on which the quantum circuit can be implemented and/or an amount of time needed for the quantum circuit to converge to a solution of a problem (e.g., a combinatorial optimization problem). In some examples, the one or more constraints may include a maximum level of noise, or a number of quantum resources used (e.g., a number of qubits, circuit depth).

In some embodiments, the approximating the filtering operator may comprise using a parametrized quantum circuit and using the Stochastic Gradient Descent method to determine a set of parameters for generating the approximate filtering operator.

Optionally, in the computing system, after iterative applications of the filtering operator, the cost function arrangement enables a ground state for the one or more quantum circuits to be computed. In some embodiments, after iterative applications of the filtering operator, the cost function arrangement may enable minimizing an energy expectation value of the system.

In some embodiments, application of a filtering operator on a parametrized quantum circuit associated with a quantum variational filtering (QVF) algorithm (e.g., for solving a combinatorial optimization problem) may facilitate and accelerate searching for the circuit parameters that minimize the energy expectation value of the corresponding quantum state. In some examples, the minimized expectation value of the corresponding quantum state corresponds to a solution of a combinatorial optimization problem.

Optionally, in the computing system, at least a subset of the one or more quantum computers is implemented using trapped ion quantum processors. Alternatively or additionally, it will be appreciated that over types of quantum computers can be used including but not being limited to superconductor based quantum computers, photonic quantum computes and the like. In some examples, a superconductor based quantum computer or a superconducting quantum computer may include a Josephson junction cryogenic gate-based quantum computers.

According to a second aspect, there is provided a method for using a computing system including one or more classical binary computers coupled to one or more quantum computers. The method includes: configuring the one or more classical binary computers to receive one or more computing tasks via an input port, and configuring the one or more quantum computers to execute one or more quantum circuits that are generated from the one or more tasks to generate corresponding output results for the one or more classical binary computers to use to generate the corresponding computational results that are output via an output port. The method further includes configuring the computing system to process the one or more computing tasks including at least one combinatorial optimization task using a Variational Quantum Eigensolver (VQE) algorithm implemented by using one or more Ansätze and a cost function arrangement to generate the one or more quantum circuits; and configuring the computing system to apply iteratively a filtering operator to the cost function arrangement to generate a corresponding filtered cost function arrangement of a Filtering Variational Quantum Eigensolver (F-VQE) algorithm that excludes one or more energy states of the cost function arrangement that exceed an energy threshold and to retain one or more energy states of the cost function arrangement that are below the energy threshold, wherein the filtered cost function arrangement is used in the one or more quantum circuits to generate the output results.

Optionally, in the method, the cost function arrangement includes one or more Hamiltonians representative of a real physical system.

Optionally, the method includes configuring the one or more classical binary computers to compute one or more causal cones that are representative of one or more principal computation paths within the one or more quantum circuits that contribute to the output results, and wherein the one or more classical binary computers are configured to omit one or more parts of the one or more quantum circuit whose contribution to the output results are below a threshold value.

In some embodiments, the filtering operator may comprise an approximated filtering operator implemented using a parameterized quantum circuit whose optimal approximation parameters are learned via stochastic gradient descent.

More optionally, the method includes omitting the one or more parts corresponds to a reduction in a number of qubits required to implement the one or more quantum circuits.

More optionally, the method includes omitting the one or more parts corresponds to a reduction in circuit depth of the one or more quantum circuits.

Optionally, in the method, a repeated action of the filtering operator results in a given quantum state projecting out high-energy eigenstates that correspond to sub-optimal solutions to at least one combinatorial optimization task.

Optionally, the method includes configuring the computing system to compute a stochastic gradient descent when applying the filtering operator to the cost function arrangement to reduce a number of optimization steps required for generating the filtered cost function arrangement, to avoid local minima when optimizing the F-VQE algorithm.

Optionally, in the method, after iterative applications of the filtering operator, the one or more filtered Hamiltonians or the filtered cost function arrangement enable a ground state for the one or more quantum circuits to be computed. FVQE addresses the problem of reducing the number of optimization steps required by approximating and learning the filtering operator by using a Parameterized Quantum Circuit whose optimal approximation parameters are learned via Stochastic Gradient Descent. Such an approach makes FVQE implementable and successful on contemporary NISQ quantum computers.

Optionally, in the method, at least a subset of the one or more quantum computers is implemented using trapped ion quantum processors. In some embodiments, the one or more quantum computers may be implemented using superconductor based quantum processors, photonic quantum processors and the like.

According to a third aspect, there is provided a software product that is executable on the computing system of the first aspect to implement the method of the second aspect.

BRIEF DESCRIPTION OF THE DRAWINGS

Embodiments of the disclosure will be described, by way of example, in the disclosure with reference to the following diagrams, wherein.

Figures 1A, 1B, 1C:
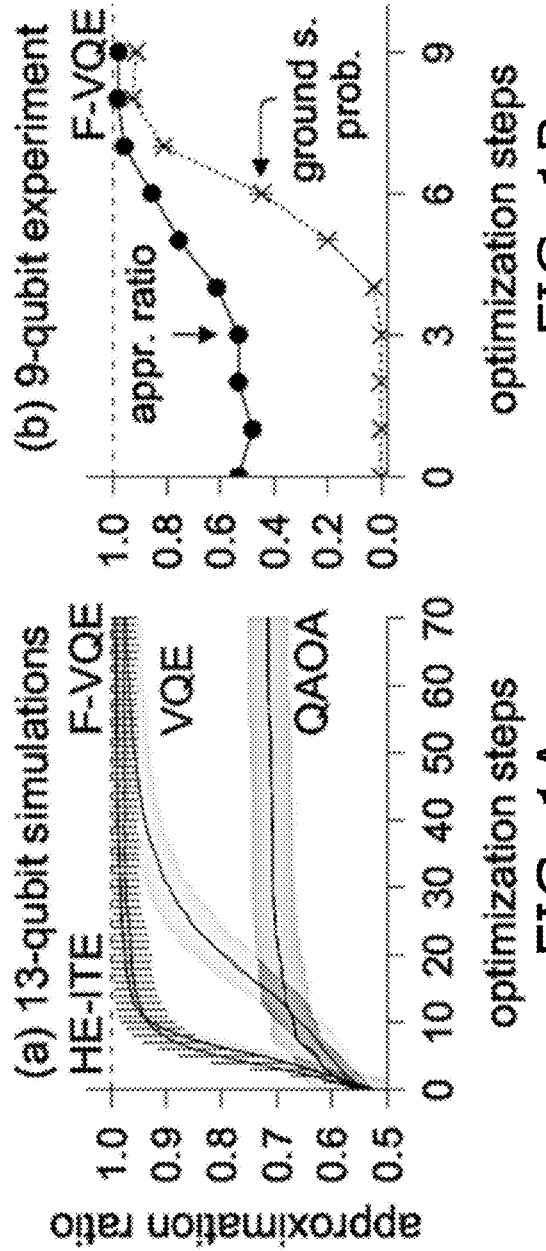
FIG. 1A shows an average approximation ratio (namely, lines) and a standard deviation (namely, shaded regions for F-VQE, VQE and QAOA, and error bars for HE-ITE) across twenty-five random MaxCut problems.
FIG. 1B shows an approximation ratio and a probability of sampling a ground state for a single random MaxCut instance solved on a trapped-ion quantum processor.
FIG. 1C shows an average approximation ratio (namely line) and a standard deviation (namely, shaded region) across twenty-five random MaxCut problems. Inset shows causal cone widths, namely an actual number of qubits required on quantum hardware, and their average frequency with associated standard deviation.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

Variational quantum algorithms are a promising tool to derive most benefit from contemporary noisy intermediate scale quantum (NISQ) computers that are gate-based. These algorithms use parameterized quantum circuits that can be tailored to quantum hardware constraints such as qubit connectivities and quantum gate fidelities. Thus, a well-known method for implementing combinatorial optimization includes encoding an optimal solution in a ground state of a classical multi-qubit Hamiltonian. Such a method is used in popular variational quantum algorithms such as Variations Quantum Eigensolvers (VQE) and Quantum Approximation Optimization Algorithms (QAOA), wherein such quantum algorithms attempt to prepare a ground state by searching for quantum circuit parameters that reduces an energy expectation value of a corresponding quantum state to a minimum value. Moreover, VQE imposes no restrictions on an Ansatz circuit used and has become a powerful method to use in combinatorial optimization. However, in a case of combinatorial optimization, VQE tends to generate sub-optimal solutions. In contradistinction, QAOA uses a specific type of Ansatz quantum circuit that is inspired by adiabatic quantum computation and a Trotterization of a time evolution corresponding to quantum annealing. Despite its promising properties, the QAOA Ansatz requires a quantum circuit depth that is technically challenging to achieve using contemporary NISQ quantum computers.

Quantum Approximate Optimization Algorithms (QAOA) may be used to configure the quantum computers to solve combinatorial optimization problems that are representative of operation of real-life systems. Such solutions can be used to control the real-life systems so that the real-life systems function in a more effective and efficient manner (e.g., by providing improved and better-optimized feedback control of real-life systems). However, given that quantum computers (in particular NISQ computers) are inherently stochastically noisy devices and that noise associated with quantum computation task may increase with the corresponding quantum circuit depth, a computation error rate of quantum computations increases with quantum circuit depth. As such, there is a need for more effective algorithms for configuring such quantum computers when used to solve combination optimization problems, for example for providing improved and better-optimized feedback control of real-life systems. Moreover, it is known that QAOA sometimes iterates to non-optimal solutions that are potentially erroneous. Furthermore, QAOA often requires certain quantum circuits to be used that are challenging to achieve using contemporary quantum computing hardware.

Figure 8:
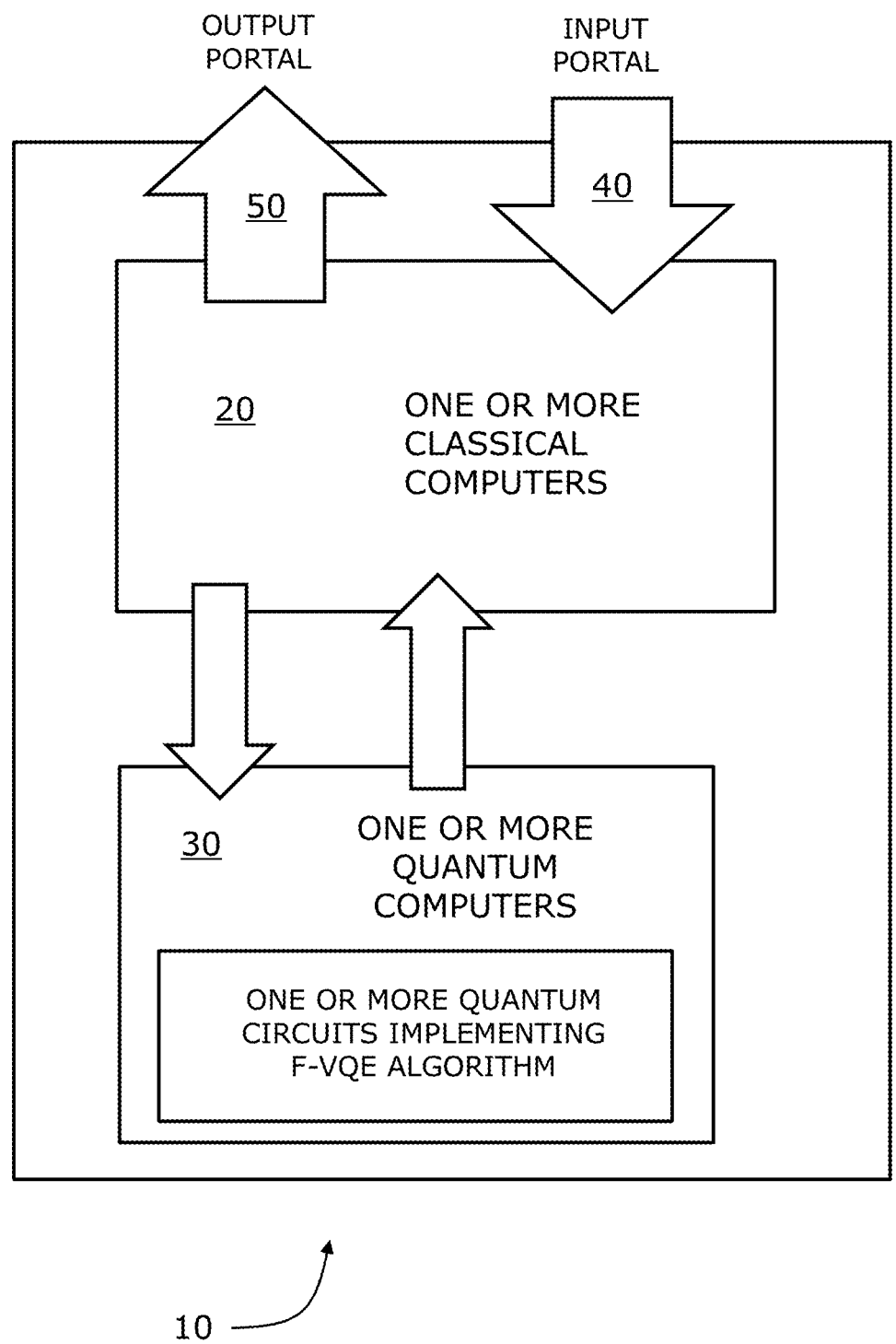
FIG. 8 illustrates of an implementation of a computing system pursuant to the present disclosure.

Referring to FIG. 8, there is shown a computing system 10, that may be used to solve problem using the methods described below. In some embodiments, the computing system 10 may include one or more classical binary computers 20 coupled to one or more quantum computers 30. The one or more classical binary computers 20 may include at least one non-transitory memory and at least one hardware processor configured to execute machine executable instructions stored in the non-transitory memory. In some embodiments, the one or more classical binary computers may include devices such as reduced instruction set computers (RISC), array processors, graphical processors unit (GPU's), and suchlike, conventionally based on Silicon integrated circuit semiconductor technology. In some embodiments, the one or more quantum computers 30 may include devices such as cryogenically-cooled Josephson junction (superconducting) quantum processors, trapped-ion quantum processors, photon-based quantum computers or other platforms that may be used to implement one or more quantum circuits comprising qubits and quantum gates. A quantum computer may be configured to allow preparing qubits, controlling qubits, and perform operations on qubits using quantum gates. In some cases, a number of qubits in a quantum computer may be in a range of 2 to 100 qubits, more optionally in a range of 2 to 1000 qubits, or even more optionally in a range of 2 to 1 million qubits. The one or more classical binary computers 20 may provide input and output ports 40, 50 for inputting data and outputting data, respectively. In some embodiments, the input port 40 and the output port 50 may be connected to a user interface (e.g., a display, a keyboard, a touch screen, and/or a mouse). In some embodiments, the input port 40 and the output port 50 may be connected to one or more computing systems via one or more data communication links.

In operation, one or more computing tasks may be received via the input port 40 by the one more classical binary computers 20 and output results generated by the computing system 10 may be provided at an output port 50. Amongst other tasks, when in operation, the one or more classical binary computers 20 can configure the one or more quantum computers 30 to perform at least a portion of the one or more computing tasks that are best suited to being executed using quantum computing resources. Such configuring may include devising one or more Ansätze (singular: Ansatz (German language)) and a cost function arrangement, for example one or more Hamiltonians, that are used to generate one or more corresponding quantum circuits that are configured via use of the one or more quantum computers 30. In some situations, the cost function arrangement can be configured as alternative functions to Hamiltonian that nevertheless represent potential energy states of a real physical system.

It is known that quantum computers are noisy on account of noise phenomena occurring therein that influence states of qubits thereof. For example, measurement apparatus that reads states of output qubits of the one or more quantum computers 30 after completion of execution of a given quantum circuit is susceptible to contributing additional noise. Furthermore, noise can arise within a given quantum circuit itself when executed on the one or more quantum computers 30 by way of microwave crosstalk; for example, microwave pulses applied to Josephson junction-implemented quantum gates or control pulses applied to electrodes of ion traps of ion-trap type quantum computers are susceptible to being coupled to other gates by way of signalling; such signalling manifests itself as noise. In order to reduce such noise, it is desirable that the one or more quantum circuits have the smallest depth that allowed performing a computing task. For example, the depth of one or more quantum circuits used for solving a problem based on minimizing a cost function may be as small as possible consistent with implementing the corresponding cost function arrangement. Such a minimization of circuit depth consistent with implementing the cost function arrangement is especially pertinent when the one or more aforesaid computing tasks relate to computation of combinatorial optimization.

It is therefore desirable that the computing system 10 is configured for more efficient computation associated with combinatorial optimization. In some examples, computing procedures associated with the more efficient computation may comprise configurations that can be implemented using quantum circuits having smaller circuit depths. In some embodiments, such more efficient computation may be performed by the one or more quantum computers 30 using a Filtering Variational Quantum Eigensolver (F-VQE) algorithm, pursuant to the present disclosure. The F-VQE algorithm may use filtering operations to achieve faster and more reliable convergence of one or more quantum circuits to an optimal solution, for example as described below in the section titled "Additional information pertinent to certain embodiments". Moreover, the F-VQE algorithm optionally determines those portions of the aforesaid one or more quantum circuits that principally contribute to an output of quantum computations performed in the one or more quantum circuits (herein referred to as causal cones), and also determines other portions of the one or more quantum circuits that do not contribute or contribute below a threshold amount to the output of the quantum computations. In some embodiments, limiting the qubits and gates used for solving a given computational problem to those within the one or more causal cones of the one or more quantum circuits may enable fewer qubits to be employed for solving the given computational problem. In certain situation, use of the causal cones can be used to implement quantum computation tasks using fewer qubits and/or shallower quantum circuits. Thus, one or more Filtering Variational Quantum Eigensolver (F-VQE) algorithms are used in the computing system 10 may benefit from determining and using the causal cones of the corresponding quantum circuits configured to solve a combinatorial optimization problem based on F-VQE algorithm.

The F-VQE algorithm may be considered a more efficient form of conventional variation quantum eigen solver (VQE) that uses a modified quantum variational filtering (QVF) algorithm based on approximated filtering operators implemented using gradient-descent method. In some embodiments, QVF approximates the repeated action of a filtering operator on an initial quantum state by successively optimizing the variation parameters of a parametrized quantum circuit using gradient-descent method. As such, in some cases, the F-VQE algorithm may be further considered a more efficient form of quantum variational filtering (QVF) algorithm. F-VQE is described with greater detail below in the section titled "Additional information pertinent to certain embodiments".

When applying the F-VQE algorithm, it is desirable that the F-VQE algorithm applies its filtering operator efficiently to a cost function so that the F-VQE algorithm iterates to computing the ground state in as few iterative steps as possible. It is desirable that a gradient representative of energy that drives such an iteration does not have local minima or plateau regions of low gradient. By suitable choice of a gradient function, as described in greater detail in below (in the section titled "Additional information pertinent to certain embodiments"), the occurrence of such plateaus and/or local minima can be avoided.

In some cases, the cost function may comprise one or more Hamiltonians. In some cases, When a problem is solved using the F-VQE, the term "Hamiltonian" may be generalized by "cost function".

In some cases, the F-VQE algorithm is not able to modify the cost function arrangement in a manner that significantly performs better than conventional VQE. When such a situation is encountered, an explanation is that the cost function arrangement and its associated Ansatz may already be optimal without a need for being iteratively filtered to improve its convergence characteristics.

Next, a method of the disclosure will be described with reference to FIG. 9; the method may be implemented using machine readable instructions (e.g., a software) that are executable on the computing system 10. In some embodiments, the machine-readable instructions may be stored in a non-transitory memory and executed by a hardware processor of a classical binary computer of the one or more classical binary computers 20. The method may use the computing system 10 including the one or more classical binary computers 20 coupled to the one or more quantum computers 30. In some embodiments, the method may include:

(i) a first step 100 of configuring the one or more classical binary computers 10 to receive one or more computing tasks via an input port 40;

(ii) a second step 110 of configuring the one or more quantum computers 30 to execute one or more quantum circuits that are generated from the one or more tasks to generate corresponding output results for the one or more classical binary computers 20 to use to generate the corresponding computational results that are output via an output port 50;

(iii) a third step 120 of configuring the computing system 10 to process the one or more computing tasks including at least one combinatorial optimization task using a Filtering Variational Quantum Eigensolver (F-VQE) algorithm implemented by using one or more Ansätze and a cost function arrangement to generate the one or more quantum circuits; and (iv) a fourth step 130 of configuring the computing system 10 to apply iteratively a filtering operator to the cost function arrangement to generate a corresponding filtered cost function arrangement of the Filtering Variational Quantum Eigensolver (F-VQE) algorithm that excludes one or more energy states of the cost function arrangement that exceed an energy threshold and to retain one or more energy states of the cost function arrangement that are below the energy threshold, wherein the filtered cost function arrangement is used in the one or more quantum circuits to generate the output results.

As aforementioned, the cost function arrangement is optionally implemented using one or more Hamiltonians representative of a real physical system.

Optionally, the method may include configuring the one or more classical binary computers 20 to compute one or more causal cones that are representative of one or more principal computation paths within the one or more quantum circuits that contribute to the output results, and to omit one or more parts (e.g., qubits and gates) of the one or more quantum circuit whose contribution to the output results are below a threshold value or are not included in the one or more causal cones. The principal computation paths may comprise one or more qubits and gates in a quantum circuit (e.g., ansatz circuit) that can affect corresponding expectation values associated with the quantum circuit.

More optionally, the method includes omitting the one or more parts corresponds to a reduction in a number of qubits required to implement the one or more quantum circuits. More optionally, the method includes omitting the one or more parts corresponds to a reduction in circuit depth of the one or more quantum circuits. More optionally, in the method, a repeated action of the filtering operator results in a given quantum state projecting out high-energy eigenstates that correspond to sub-optimal solutions to at least one combinatorial optimization task. More optionally, the method includes configuring the computing system 10 to compute a stochastic gradient descent when applying the filtering operator to the cost function arrangement to reduce a number of optimization steps required for generating the cost function arrangement, to avoid local minima when optimizing the F-VQE algorithm. More optionally, in the method, after iterative applications of the filtering operator, the filtered cost function arrangement enables a ground state for the one or more quantum circuits to be computed. More optionally, in the method, at least a subset of the one or more quantum computers 30 is implemented using trapped ion quantum processors.

Optionally, the method includes applying Error Mitigation post-processing of the data coming out of the one or more quantum computers 30, wherein an error-corrected version of the data is fed back to the one or more classical binary computers 20 at each iteration.

Figure 9:
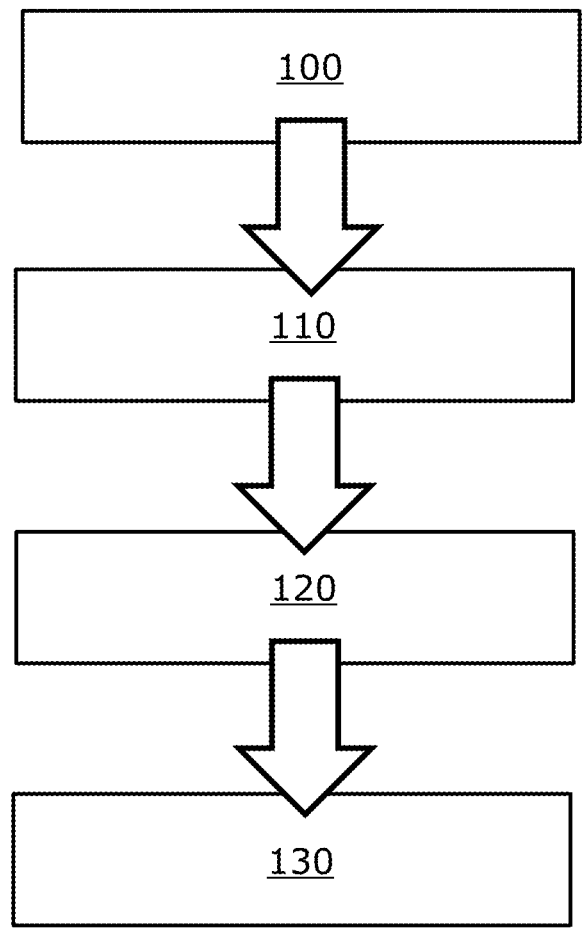
FIG. 9 illustrates steps of a method for operating the computing system of FIG. 8.

With reference to FIG. 9, the method is beneficially implemented using machine readable instructions (e.g., a software product) that are executable on the computing system 10.

The computing system 10 is susceptible to being used to monitor real physical systems, or control the real physical systems (e.g., via feedback control). The F-VQE method of the present disclosure enables states (e.g., energy states) of a given system to be determined more efficiently that enables optimal assessment and control of the given system. The given system can be, for example, a manufacturing facility (for example, a steel works), an energy generating facility (for example, a configuration of wind turbines, solar panels and geothermal plant), a transport system (for example, a railway network), an agricultural facility (for example, a configuration of greenhouses for implementing edible crop production), a rubbish recycling installation (for example, plastics material recycling apparatus), and so forth. By quickly and efficiently identify optimal states of the given system, a high degree of real-system optimization is susceptible to being achieved.

The computing system 10 is thus susceptible to being used as a component part of a control system that is capable of optimally controlling the given system. Optionally, in such a control system, when implemented in practice, the one or more quantum computers 30 are provided at a remote location relative to the given system, wherein the one or more quantum computers 30 are coupled via a communication network (e.g., via the Internet and/or via a mobile wireless network) to the given system. Optionally, at least one of the one or more classical computers 20 is located locally to the given system, and is configured to perform a control function on the given system using data provided by the one or more quantum computers 30.

Figure 10:
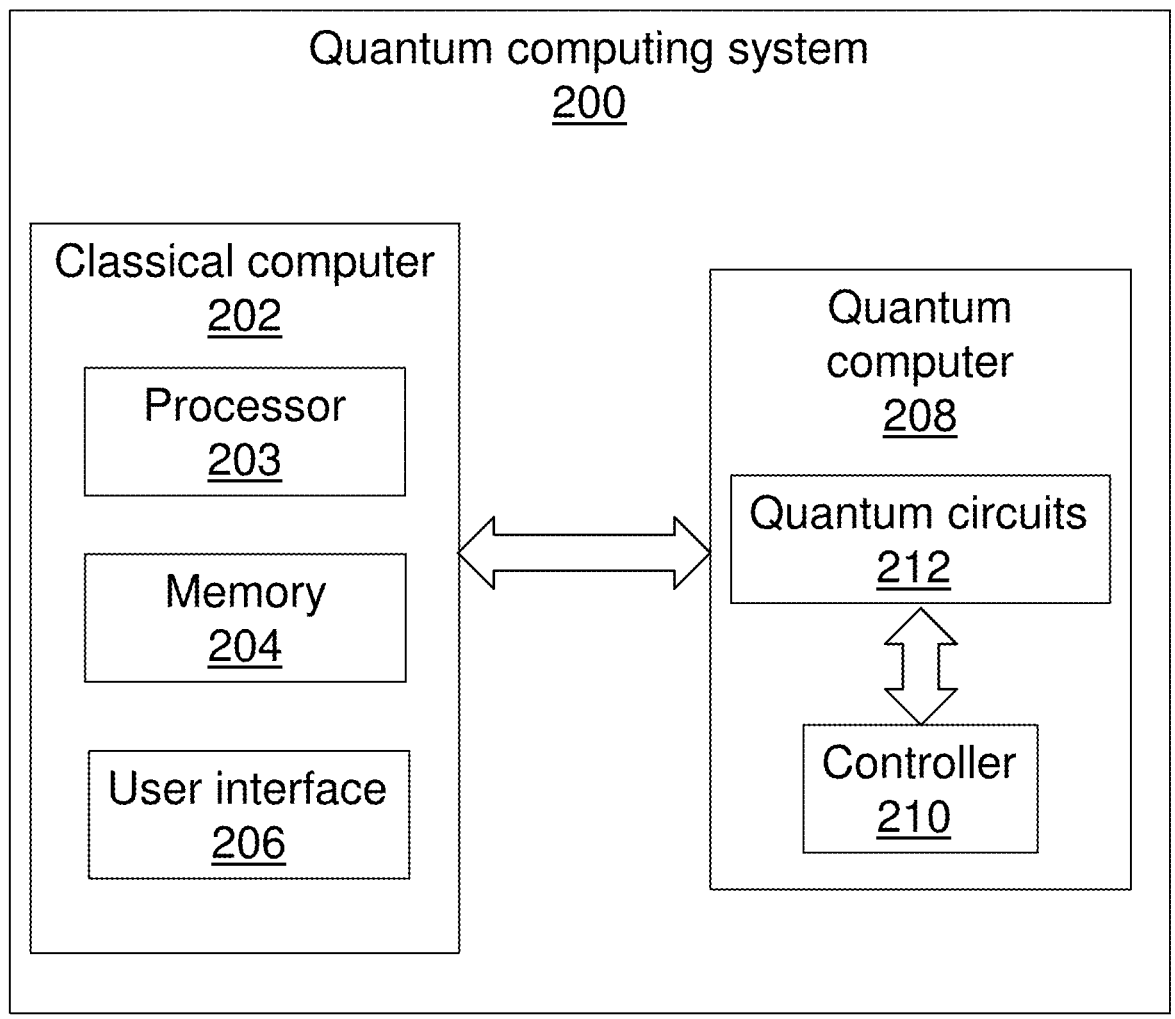
FIG. 10 illustrates a block diagram illustrating an example computing system that includes a classical computer combined with a quantum computer.

FIG. 10. is a block diagram illustrating an example computing system 200 that includes a classical computer 202 combined with a quantum computer 208. The computing system 200 may comprise one or more feature described above with respect to the computing system 10. In some cases, the classical computer 202 and the quantum computer 208, may be included or integrated in the same housing. The classical computer 202 may include a user interface 206, first hardware processor 203 and a first non-transitory memory 204. The quantum computer 808 may have a controller 210 that includes a second hardware processor and a second non-transitory memory (not shown). In some cases, the classical computer 202 may execute computer-executable instructions stored in the first non-transitory memory 204 to: control the operation of the classical computer 202, the flow of data between the classical computer 202 and the quantum computer 208, and control, at least in part, the operation of the classical computer 202. In some cases, the classical computer may send data and commands to the controller 210 and the controller 210 may configure one or more quantum circuits 212 according to the data and commands received from the classical computer 202.

The computing system 200 may be used to solve a combinatorial optimization problem using a filtering variational quantum eigen solver (F-VQE). F-VQE may solve a combinatorial optimization problem faster and using less quantum resources compared to other variational quantum algorithms such as VQE and QAOA. In some embodiments, a combinatorial optimization problem may be solved by encoding the solution in a ground state of a classical multi-qubit Hamiltonian. In some embodiments, a VQE algorithm may use a parametrized quantum circuit and find a solution to the combinatorial optimization problem by searching for circuit parameters (e.g., parameter values) that minimize an energy expectation value of the corresponding quantum state (e.g., the quantum state associated with the quantum circuit). In some cases, a quantum vibrational filtering algorithm (QVF) may be used to reduce a number of optimization steps used to the circuit parameters that minimize the energy expectation value. For example, the QVF algorithm may approximate the repeated action of a filtering operator on an initial quantum state (e.g., a quantum state associated with an ansatz quantum circuit) by successively optimizing the parameters of the corresponding parametrized quantum circuit starting from a parametrized quantum circuit ansatz. In some cases, the optimization may comprise minimizing a Euclidean distance between the parametrized quantum state associated with the parametrized quantum circuit, and a state generated by the operation of the filtering operator on a quantum state. The corresponding Euclidean distance may be referred to as "filtered cost function". In some cases, minimizing the filtered cost function may rely on special tests (e.g., Hadamard test), which require quantum resources that may not be available in a conventional quantum computation platform. Moreover, execution of quantum circuits comprising these resources may slow down the optimization process. The repeated action of the filter operator on a quantum states may filter out the high energy states of the quantum state effectively increasing the overlap between the quantum state and the ground state. As such, minimizing the filtered cost function may result in faster convergence of the quantum circuits to a solution (e.g., a state having a minimum energy expectation value).

In some embodiments, the F-VQE algorithm may comprise a modified version of a quantum vibrational filtering (QVF) that does not rely on the special tests for minimizing the filtered cost function. In some embodiments, F-VQE may use a specific gradient based procedure for minimizing the filtered cost function that does not need quantum resources beyond what is needed for a conventional VQE algorithm that does not use a filtered cost function. In some embodiments, the gradient based procedure may comprise an analytical gradient descent method.

In some embodiments, F-VQE may approximate and learn the filtering operator by using a parameterized quantum circuit whose optimal approximation parameters are learned using a stochastic gradient descent algorithm. This approach makes F-VQE implementable on quantum computing platforms and resources available today (e.g., conventional quantum computer based ion-traps, superconducting gates, or photonic systems).

In various implementations, the filtering operator (F) may comprise a real-valued function (f) of the Hamiltonian of the corresponding problem (e.g., combinatorial optimization problem) and a parameter $\tau$. In some embodiments, $f^2$ may be a strictly decreasing function of energy for any $\tau$. In some embodiments, F-VQE algorithm may comprise dynamic adaptation of $\tau$ during optimization process for keeping a gradient norm associated with the gradient descent method as close as possible to a reference value at every optimization step.

In some cases, during optimization process, F-VQE may sample an entire quantum circuit (e.g., an ansatz circuit) to evaluate a global observable while certain portions of the quantum circuit may have little or no effect on the outcomes of the optimization processes. In some embodiments, the efficiency of the F-VQE may be improved by limiting the gates and qubits used during the optimization process to those that contribute to the outcomes. The portions of a quantum circuit (including quantum gates and qubits) that contribute to the outcomes, may be referred to causal cones of the corresponding quantum circuit. In some implementations of F-VQE, the causal cones of the corresponding quantum circuit (e.g., ansatz circuit) may be determined and used for an optimization process.

In some embodiments, the classical computer 202 may generate and provide control signals, and input data to the quantum computer 208 for solving a problem based on a F-QVE algorithm. In some examples, input data may include data usable for preparing an ansatz quantum circuit, selecting the corresponding causal cones, preparing cost function arrangements, and the like. The input data may also include data usable for controlling the computation process in the quantum computer 208. In some embodiments, the execution of optimization steps associated with the F-QVE on the quantum computer may be controlled by the control signals and input data. In some embodiments, the control signals and input data may be received by the controller 210 of the quantum computer 208.

In some cases, at least part of the input data may be generated by the classical computer 202 using user data and user instructions received via the user interface 206 or stored data stored in the memory 204. In some cases, at least part of the input data may comprise stored data stored in the memory 204.

Additional Information Pertinent to Certain Embodiments

This section includes extracts from a scientific publication that was made public after the priority date of the present disclosure: arXiv:2106.10055v3 [quant-ph] 10 Feb. 2022, namely "*Filtering Variation Quantum Algorithms for combinatorial optimization*"; the authors of the scientific publication include David Amaro, Carlo Modica, Matthias Rosenkranz, Mattia Fiorentini, Marcello Benedetti, Michael Lubasch. Extracts of the contents of this scientific publication are hereby incorporated below.

Contemporary quantum computers are susceptible to executing quantum circuit algorithms to provide solutions to problems of combinatorial optimization. To make such combinatorial optimization more efficient, implementations pursuant to the present disclosure use a Filtering Variational Quantum Eigensolver (F-VQE) which utilizes filtering operations to achieve faster and more reliable convergence to compute an optimal combinatorial solution using Variational Quantum Eigensolver (VQE) algorithms. Optionally, the aforesaid implementations use causal cones to reduce the number of qubits required on a given quantum computer when implementing a given computation. In devising the aforesaid implementations, there were used random MaxCut problems to develop methods of the present disclosure, and to show that they perform better than conventional known VQE algorithms and the Quantum Approximate Optimization Algorithm (QAOA). More, there was also shown that the methods are susceptible to being implemented on trapped-ion quantum processors.

Next, there is described a progression from mathematical proofs to a near term, fully specified and implementable quantum computing algorithm. As aforementioned, implementations pursuant to the present disclosure use F-VQE, wherein F-VQE optimises a parameterized VQE quantum circuit to approximate an action of a filtering operator on the VQE quantum circuit. F-VQE is a special implementation of VQE which is similar to the VQE but has an advantage of being particularly efficient. When implementing F-VQE, there is used a filtering operator $F \equiv f(\mathcal{H} ; \tau)$ defined via a real-values function $f$ of a given problem Hamiltonian $\mathcal{H}$ and a parameter $\tau$ in such a way that $f^2(E; \tau)$ strictly decreases with energy E for any $\tau>0$. The parameter $\tau$ plays a role that is similar to a time step used in imaginary time evolution (ITE) and its associated ITE operator $\exp(-\tau \mathcal{H})$ is one example of a filtering operator. In implementations of the present disclosure, a repeated action of a filtering operator in a given quantum state projects out high-energy eigenstates that correspond to sub-optimal solutions to a given combinatorial optimization problem; such projecting-out of high energy eigenstates enables these eigenstates to be removed by filtering, thereby increasing accuracy and speed with which a desired quantum computation can be performed.

It will be appreciated that QVF and F-VQE impose no restrictions on an Ansatz circuit to be used, and so QVF and F-VQE beneficially use an Ansatz which is most suitable for executing on the one or more quantum computers 30. Such an Ansatz can be defined by using filtering based on using causal cones in the optimization that can drastically reduce the required number of qubits in a quantum circuit to be executed using the one or more quantum computers 30.

FIGS. 1A to 1C illustrate results of performance measurements pertaining to algorithms of the present disclosure, wherein a Filtering Variational Quantum Eigensolver (F-VQE) algorithm uses an inverse filtering operator. One optimization step corresponds to a one-time step in HE-ITE and one update of all parameters in F-VQE, VQE and QAOA. In FIG. 1A, there are shown an average approximation ratio (namely, lines) and a standard deviation (namely, shaded regions for F-VQE, VQE and QAOA, and error bars for HE-ITE) across twenty-five random MaxCut problems. In FIG. 1B, there are shown an approximation ratio and a probability of sampling a ground state for a single random MaxCut instance solved on a trapped-ion quantum processor. In FIG. 1C, there is shown an average approximation ratio (namely line) and a standard deviation (namely, shaded region) across twenty-five random MaxCut problems. Moreover, there are shown inset causal cone widths, namely an actual number of qubits required on quantum hardware, and their average frequency with associated standard deviation. As shown in FIG. 1 F-VQE consistently achieves larger approximation ratios after fewer optimization steps than conventional VQE and QAOA.

Methods

Next, there is described a mathematical property of a filtering operator. Example of filtering operators for use in implementations of the present disclosure will be described in greater detail. Given a n-qubit Hamiltonian $\mathcal{H}$, a filtering operator $F \equiv f(\mathcal{H} ; \tau)$ can be defined via a real-valued function $f(E; \tau)$ of the energy E and a parameter $\tau>0$. However, it will be appreciated that it is necessary that the function $f^2(E; \tau)$ is strictly decreasing on an associated interval given by the complete spectrum of the Hamiltonian $E \in [E_{min}, E_{max}]$. The filtering operators are Hermitian, and commute with the Hamiltonian by definition.

When a given quantum state $|\psi\rangle$ is sampled in the in the eigenbasis $\{|\lambda_x\rangle : x=0, 1, \ldots, 2^n-1\}$ of a Hamiltonian, the probability distribution of eigenvectors is given by $P_\psi(\lambda_x) = |\langle \psi | \lambda_x \rangle|^2$. Applying the filtering operator to the quantum state produces a new quantum state $$|F\psi\rangle = F|\psi\rangle / \sqrt{\langle F^2 \rangle_\psi}$$

that generates a probability distribution that depends in the energy $E_x$ of each eigenstate $|\lambda_x\rangle$:

$$P_{F\psi}(\lambda_x) = \frac{f^2(E_x; \tau)}{\langle F^2 \rangle_\psi} P_\psi(\lambda_x) \qquad \text{Eq. 1}$$

as provided in Equation 1 (Eq. 1).

For non-eigenstates $|\psi\rangle$, the filtering operator has an action to increase a probability of all overlapping eigenstates $|\lambda_x\rangle$ (i.e., with $P_\psi(\lambda_x)>0$) for which $f^2(E_x; \tau)$ and decreases the probability of all overlapping eigenstates $|\lambda_y\rangle$ for which $f^2(E_y; \tau) < \langle F^2 \rangle_x$. Since $f^2(E; \tau)$ is strictly decreasing in E, such eigenstates exist for any non-eigenstate $|\Phi\rangle$. Hence, under the application of the filtering operator, the probability of sampling eigenstates with low energy increase while the probability of sampling eigenstates with high energy decreases. Importantly, such a benefit provided by using the filtering operator leads to a reduction of the average energy in a quantum circuit computation. After sufficiently many applications of the filtering operator, a ground state for the quantum circuit computation is produced.

Figures 2A, 2B:
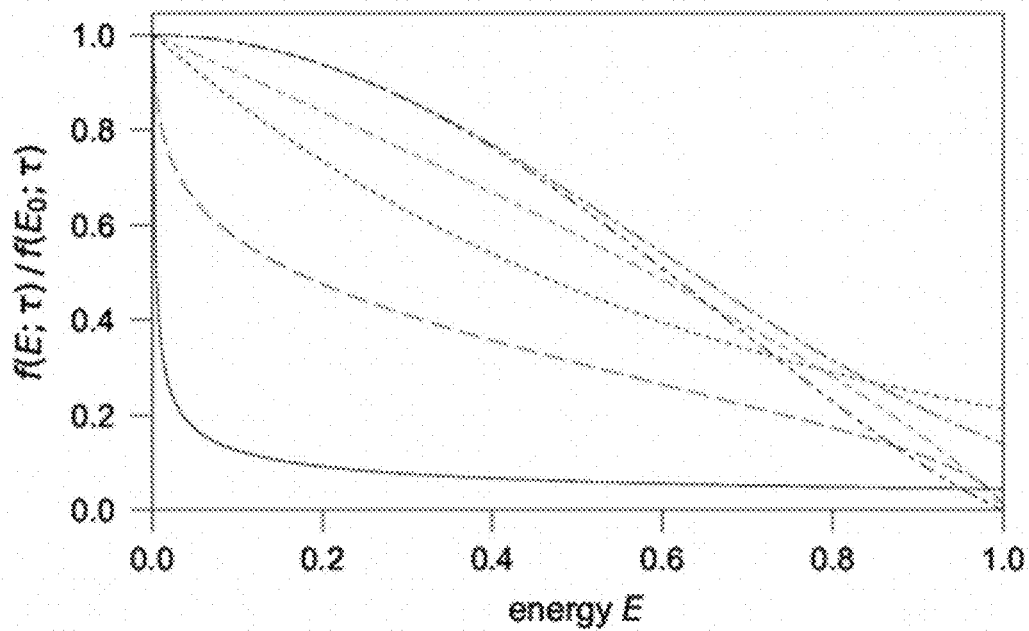
FIG. 2A illustrates the responses of example filtering operators used in implementations of the disclosure.
FIG. 2B shows the type of filter, the corresponding mathematical representation, the first value $\tau_1$, and standard deviation of $\tau$ (values after $\pm$), for each curve in FIG. 2A.

Some examples of some filtering function definitions are given in FIG. 2. FIG. 2A illustrates example filtering operators used in implementations of the disclosure. In FIG. 2, a value of $f(E; \tau)/f(E_0; \tau)$ is plotted against an energy range $E \in [E_0, 1]$: for a ground state energy $E_0=0.001$. The value of $\tau$ used in FIG. 2A is a first value $\tau_1$ selected at a first optimization step, averaged across twenty-five 13-qubit problem instances. FIG. 2B shows the type of filter, the corresponding mathematical representation, the first value $\tau_i$, and standard deviation of $\tau$ (values after $\pm$), for each curve in FIG. 2A. For the Chebyshev filter, the value used in generating FIG. 2 is rounded to a value of 5. In some examples, a Chebyshev filtering operator approximates to a Dirac delta operator $\delta(\mathcal{H})$ using the expansion into Chebyshev polynomials up to an order $\tau$:

$$\delta(\mathcal{H}) \approx f(\mathcal{H}; \tau) = \sum_{m=0}^{\lfloor \tau/2 \rfloor} (-1)^m \frac{2-\delta_{m0}}{\pi} g_{2m}^{(\tau)} T_{2m}(\mathcal{H}) \quad (2)$$

$$g_k^{(\tau)} = \frac{(\tau - k + 1)\cos\frac{\pi k}{\tau+1} + \sin\frac{\pi k}{\tau+1}\cot\frac{\pi}{\tau+1}}{\tau + 1}. \quad (3)$$

as provided by Equations Eq. 2 and Eq. 3 above. In Eqs. 2 and 3, $\delta_{mk}$ is the Kronecker delta and the Chebyshev polynomials are defined by the recursive formula $T_{k+1}(x) = 2xT_k(x) - T_{k-1}(x)$ with $T_0(x)=1$, $T_1(x)=x$. Moreover, the parameter in the filtering operator definition is representative by a time step parameter of imaginary time evolution. For example, for the exponential filtering operator in FIG. 2, $\tau$ is precisely the imaginary time step. This parameter interpolates an action of the filtering operator between two limits. For vanishing values of $\tau \to 0$, the filtering operator becomes the identity operator; conversely, for sufficiently large of $\tau \to \infty$, the filtering operator becomes a projector onto the ground state.

Quantum Variational Filtering (QVF)

Next, algorithm that implement the filter operator approximately using unitary operators will be described. Note that only a unitary operator can be implemented by quantum computers (without mid-circuit measurements and other techniques that are of little feasibility). An important point of QVF is to use Parameterized Quantum Circuits. In implementations of the present disclosure, a QVF algorithm approximates a repeated action of a filter operator on some initial quantum state by successively optimizing variation parameters of a parameterized quantum circuit. For example, the parameterized quantum circuit is defined to solve a Variational Quantum Eigensolver problem. The QVF algorithm starts at an initial optimization step t=0 by preparing an initial state $|\psi(\theta 6)\rangle$ that has a finite overlap with a ground state: $P_{\psi_0}(\lambda_0) > 0$. Next, the algorithm proceeds iteratively, wherein t≥1 approximates the state $|F_t\psi_{t-1}\rangle$, that results from exactly applying the filtering operator $F_t$ to the state $|\psi_t\rangle$. A subscript t in $F_t$ indicates that the filtering operator is susceptible to change at each optimization step. The QVF algorithm stops after an initially chosen number of optimization steps have been completed. Moreover, in order to approximate the application of the filtering operator, there is prepared a parameterized quantum circuit Ansatz $|\psi(\theta)\rangle$ that depends on a vector of m parameters $\theta = (\theta_1, \ldots, \theta_m)$. At a given optimization step t, there is executed a search for the parameters that minimize a Euclidean distance between a corresponding parameterized quantum state and $|F_t\psi_{t-1}\rangle$:

$$C_t(\theta) = \frac{1}{2}||\psi(\theta)\rangle - |F_t\psi_{t-1}\rangle||^2 \quad (4)$$

$$= 1 - \frac{\text{Re}\langle\psi_{t-1}|F_t|\psi(\theta)\rangle}{\sqrt{\langle F_t^2\rangle_{\psi_{t-1}}}}.$$

as given in Equation 4 (Eq. 4). A final vector of parameters obtained at the end of the minimization of Eq. 4 defines a quantum state $|\psi_t\rangle \equiv |\psi(\theta_t)\rangle$ at the optimization step t. Equation 4 provides a cost function that can be minimized by using a Hadamard test, which needs one additional ancilla qubit and several additional controlled operations, as will be described in greater detail in below (for example sub-section titled: Hadamard test for QVF).

Figure 4A:
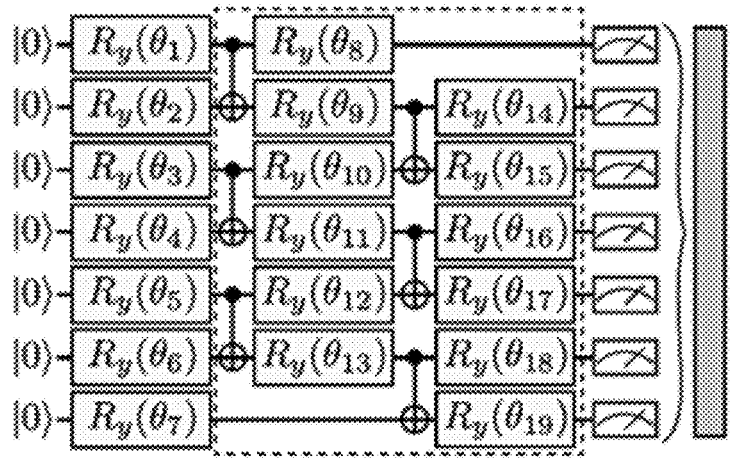
FIG. 4A illustrates a parameterized quantum circuit (e.g., an ansatz circuit) used in implementations of the disclosure.
Figure 4B:
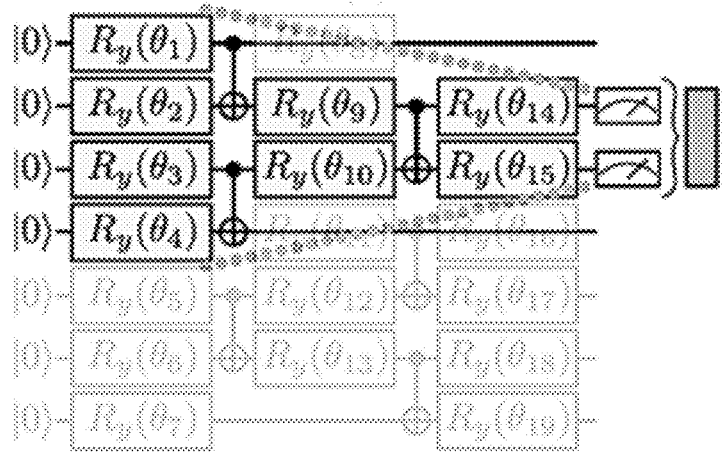
FIG. 4B illustrates an example of causal cone (highlighted qubits and gates) of the quantum circuit shown in FIG. 4A.
Figure 4C:
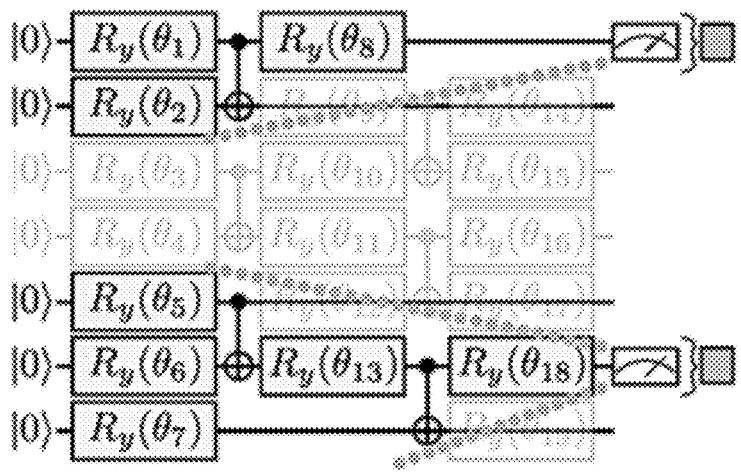
FIG. 4C illustrates another example of causal cone (highlighted qubits and gates) of the quantum circuit shown in FIG. 4A.

FIGS. 4A to 4C are illustrations of a parameterized quantum circuit (e.g., an ansatz circuit) defined by a vector $\theta = (\theta_1, \ldots, \theta_m)$ of m=19 parameters. FIG. 4A relates a number p of circuit layers, where a block of gates inside a dashed rectangle are applied p times; in FIG. 4A, p=1. A F-VQE algorithm of the present disclosure samples an entire circuit to evaluate a global observable indicated by a rectangle R. In FIGS. 4B to 4C, there are highlighted qubits and gates of the quantum circuit that constitute a causal cone that HE-ITE uses to evaluate 2-local observables on two neighbouring qubits, and two non-neighbouring qubits, respectively.

Filtering VQE (F-VQE)

Next, FVQE will be described which is an implementation of VQF via specifying the update rules of the PQC. To avoid additional quantum resources being required by the aforesaid Hadamard test in QVF, implementations of the present disclosure use a Filtering Variational Quantum Eigensolver (F-VQE) algorithm. The F-VQE algorithm makes use of a specific gradient-based procedure that requires substantially the same quantum circuits to be used as for VQE. From Equation 4 (Eq. 4), there is computed a partial derivative with respect to one parameter $\theta_i$ as provided in below (section title: Analytical derivatives) in Equation 5 (Eq. 5):

$$\frac{\partial C_t(\theta)}{\partial \theta_i} = -\frac{\text{Re}\langle\psi_{t-1}|F_t|\psi(\theta + \pi e_i)\rangle}{2\sqrt{\langle F_t^2\rangle_{\psi_{t-1}}}}. \quad (5)$$

In Equation 5 (Eq. 5), the state $|\psi(\theta+\pi e_i)\rangle$ is produced by the same Ansatz circuit, but the vector of angles is shifted by an amount $\pi$ along the direction $e_i$ of parameter $\theta_i$. If the gradient is evaluated at the current vector of parameters $\theta_{t-1}$, then a parameter-shift rule yields Equation 6 (Eq. 6):

$$\frac{\partial C_t(\theta)}{\partial \theta_i}\bigg|_{\theta_{t-1}} = -\frac{\langle F_t\rangle_{\psi_{t-1}^{i+}} - \langle F_t\rangle_{\psi_{t-1}^{i-}}}{4\sqrt{\langle F_t^2\rangle_{\psi_{t-1}}}}. \quad (6)$$

In Equation 6 (Eq. 6), there are three circuits $|\psi_{t-1}\rangle$, wherein $$|\psi_{t-1}^{i\pm}\rangle \equiv |\psi(\theta_{t-1} \pm \frac{\pi}{2}e_i)\rangle$$

are produced by the Ansatz with different parameter vectors. It will be appreciated that the expectation value in the denominator of Equation 6 (Eq. 6) is the same as for all partial derivatives at a given value of t. The F-VQE algorithm pursuant to the present disclosure takes advantage of such a favourable case, as will next be described. At a given optimization step t, the F-VQE algorithm performs a single gradient-descent update as defined in Equation 7 (Eq. 7):

$$\theta_t = \theta_{t-1} - \eta \sum_{i=1}^m \frac{\partial C_t(\theta)}{\partial \theta_i}\bigg|_{\theta_{t-1}} e_i, \quad (7)$$

wherein η>0 is a learning rate. Next, the F-VQE algorithm moves onto a next cost function $C_{t+1}(\theta)$ and proceeds identically. For each optimization step, the F-VQE algorithm requires the evaluation of 2m+1 quantum circuits. The expectation value $\langle F_t \rangle_c$ of filtering operators can be efficiently evaluated by sampling the quantum state in the Hamiltonian eigenbasis. If each eigenstate $\langle F_t \rangle_\psi$ is sampled $M_x$ times from a total of M samples, the filtering operator expectation value can be approximated via the Monte-Carlo estimator f(E; τ) as provided in Equation 8 (Eq. 8):

$$\langle F_t \rangle_\psi \approx \frac{1}{M} \sum_x M_x f(E_x; \tau). \tag{8}$$

Implementations of the present disclosure are concerned with combinatorial optimizations problems, for example encoded in diagonal QUBO (Quadratic Unconstrained Binary Optimization) Hamiltonians for which the eigenbasis is the computational basis and energies can be efficiently computed. Filtering expectation values can be approximated by sampling the quantum state in the computational basis.

At each optimization step t, the samples used to compute $\langle F_t^2 \rangle_{\psi_{t-1}}$ in Eq. 6 are beneficially also used to compute an average energy $\langle \mathcal{H} \rangle_{\psi_{t-1}}$. The average energy is expected to decrease with t; at the same time, the probability of sampling the ground state is expected to increase with t. Thus, the F-VQE algorithm provides the average energy and a growing chance of sampling a low energy eigenstate or even the ground state at no extra computational cost during the optimization.

Adapting Parameter τ

Both the cost function in Eq. 4 and its gradient in Eq. 6 depend on the parameter τ via the expectation value of the filtering operator in Eq. 8. It is potentially beneficial to adapt τ dynamically to keep the gradient norm as close as possible to some desired large and fixed value at every optimization step. Such dynamical adaptation is capable of preventing the gradient from vanishing, namely approaching zero in value, and thereby enables its value to be more accurately determined. Beneficially, in the F-VQE algorithm, there is used a heuristic to adapt τ dynamically. At each optimization step, the dependence $g(\tau) = \|\nabla C_t(\tau)|_{\theta_{t-1}}\|^2$ between the gradient norm and τ is used to select the value of $\tau_t$ that returns a gradient norm as close as possible below a certain threshold $g_c > 0$. For each optimization step, such a value of $\tau_t$ is obtained by solving the implicit equation $g(\tau_t) = g_c$. It will be appreciated that g(0)=0 since, for τ=0, the filtering operator becomes the identity operator and the gradient norm vanishes. Conversely, for large τ, the gradient norm saturates at a finite value that is determined by an overlap with the ground state of the quantum circuits involved in the gradient. Taking aforesaid into account, there is selected a value $\tau_t$ by evaluating the gradient norm for increasing values of t until either:

(i) an upper bound $\tau_u > \tau_t$ such that $g(\tau_u) > g_c$ is found; or
(ii) g(τ) saturates to a constant.

Figure 3:
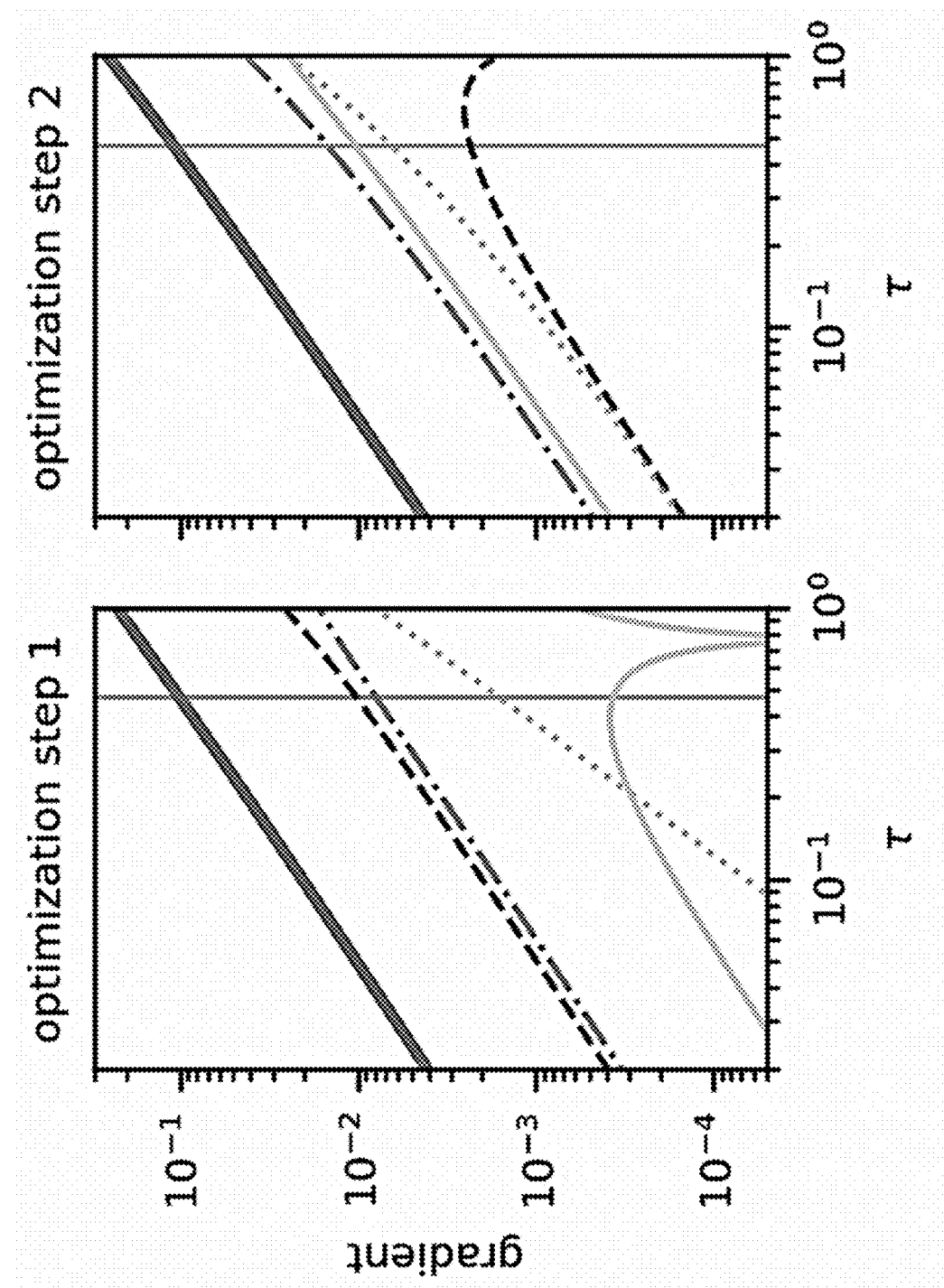
FIG. 3 is an illustrates gradients of the cost function plotted as a function of the parameter $\tau$.

In the first case (i), $\tau_t$ is searched in a range $[0, \tau_u]$ up to a certain threshold of precision. In the second case (ii), a value of $\tau_t$ is selected that provides a gradient norm closest below the threshold of precision. For the Chebyshev filtering operator used, only positive integer values of τ are allowed. Moreover, it will be appreciated that heuristics used in implementations of the present disclosure is different from a rescaling of the gradient by a constant. FIG. 3 illustrates gradients of the cost function plotted as a function of the parameter τ. For a one 13-qubit MaxCut problem (the number of variable in the MaxCut formulation is always n-qubits+1), there is plotted a gradient norm (shown as a continuous line L1) and an absolute value of partial derivatives computed from Equation 6 (Eq. 6) with respect to four parameters in an Ansatz circuit as illustrated in FIG. 4A. In FIG. 3, partial derivatives correspond to a first parameter on qubit 1 (shown as a dashed line L2), and a last parameter on qubit 1 (shown as dotted line L3), and a last parameter on qubit 13 (shown as dotted line L4). Moreover, the value of τ selected at such optimization steps is marked by using a vertical line L5 in FIG. 3. In FIG. 3, there is shown that each partial derivative changes non-trivially as a function of τ. In simulations used in implementations of the present disclosure, it is observed that the gradient norm has a consistent dependence on τ across different optimization steps and problems to be processed.

Causal Cones: Overview

The F-VQE algorithm is based on expectation value computations of filtering operators. Optionally, causal cones are used in combination with the F-VQE algorithm of the present disclosure. A causal cone of a given observable is a quantum circuit composed of only those qubits and gates in a given quantum Ansatz circuit that have an actual effect on an expectation value of the quantum circuit. Beneficially, causal cones allow a simplification of computation of the expectations values for local observables. Moreover, such a simplification results in a region outside a causal cone of a local operator unitary gates cancel with their adjoints. Thus, causal cones are an important element is various tensor network methods, for example based on the multiscale entanglement renormalization Ansatz. In FIGS. 4B and 4C, there are shown causal cones for observables with support on two neighbouring qubits and two non-neighbouring qubits, respectively. Importantly, only the qubits and gates inside the causal cone need to be prepared and executed. However, it will be appreciated for observables with support on distant qubits, the causal cone splits into two separate causal cones that can be independently realized in quantum computing hardware. Thus, using causal cones when implementing the F-VQE algorithm can reduce the required number of quantum gates and qubits when the observables have a small support.

When inspecting the filtering operators in FIG. 2, it will be appreciated that exponential filters, power filters and Chebyshev filters can beneficially make use of causal cones. For example, the exponential filter exp(−τH) is equivalent to a product of 2-local terms that can be processed independently if additional approximations are made. The power filter $(1-H)^\tau$ for integer values of τ is equivalent to a sum of at most 2τ-local terms so that the whole expectation value can be determined from a sum of simpler expectation values. Similarly, the expectation value of the Chebyshev filter can be calculated using the sum of expectation values of at most 2τ-local observables, as the Chebyshev filtering operator is a polynomial in H of degree τ.

Setup of Example Implementations of the Present Disclosure

In an example implementation of the present disclosure, a problem set is used that includes random MaxCut instances. In order to achieve an approximation ratio >16/17≈0.941 for this class of problem set is known to be "NP-hard" and therefore no classical polynomial-time algorithm is expected to exist that finds an optimal solution or improves such a limit. Moreover, each instance in the problem set is defined on a random 3-regular weighted simple undirected and connected graph with edge weights selected randomly from the uniform distribution in a range [0, 1]. The example problem set includes twenty-five instances for each problem size of $n \in \{5, 7, 9, 11, 13, 23\}$ qubits. These correspond to graphs with n+1 nodes as described below (section tilted: MaxCut problems).

Before applying filtering operators to the MaxCut Hamiltonians, it is beneficially to rescale the energy range to [0, 1]. To achieve such rescaling, lower and upper bounds of the Hamiltonian energies are computed. The lower bound is defined to be the optimum cost of the Semi-Definite Programming (SDP) relaxation of the MaxCut problem. The energy upper bound is fixed to a value of 0 since all Hamiltonian terms are negative as described below (for example in sub-section titled: MaxCut problems).

In an example F-VQE algorithm, the algorithm uses a parameterized quantum circuit as shown in FIG. 4A, wherein an initial state $|\psi_0\rangle = |+\rangle^{\otimes n}$ is prepared by setting the parameters to a value P/2 in a last rotation for each qubit and setting a remainder of the parameters to a value 0. In the F-VQE algorithm, parameters are iteratively updated using analytical gradient descent as described in Section II C. At each optimization step, the value of the parameter $\tau$ is adapted according to the procedure described in Section II D. Beneficially, a threshold of $g_c = 0.1$ is chosen for the gradient norm and the implicit equation is solved to a precision of $0 < g_c - g(\tau_t) < 0.01$. For a learning rate, there is chosen an inverse of the Hessian's diagonal $\eta = r_t^{-1}$. As shown below (for example in sub-section titled: Analytical derivatives), at each optimization step t, all diagonal elements have the same value rt and can be computed from the quantum circuit $|\psi_{t-1}\rangle$.

HE-ITE

Implementations pursuant to the present disclosure beneficially use causal codes in conjunction with the F-VQE algorithm. The F-VQE is capable of providing a similar performance to a HE-ITE algorithm. The HE-ITE algorithm can be adapted to general QUBO having long-range interactions. For example, there is beneficially used an Ansatz circuit that is depicted in FIG. 4A having p=2 layers. In FIG. 4A, a total of seventy time steps are, for example, performed with a fixed imaginary time step of t=1.0. For 23-quabit problems to be solved, it is beneficial that the number of measurement shots used is dependent on the number $n_{cone}$ of qubits in the cone as $2^{n_{cone}^2}$. When implement the VQE algorithm, there is beneficially used a same Ansatz as in F-VQE and HE-ITE, as shown in FIG. 4A. The analytical gradient for this Ansatz can be computed by using two quantum circuits per parameter as described below (for example in sub-section titled: Analytical derivatives). For the VQE cost function, the diagonal of the Hessian matrix can be obtained from the same quantum circuits as used for the analytical gradient in a similar way as in the F-VQE algorithm. For QAOA, the parameterized quantum circuit of p layers for the following algorithm defined by Equations 9 to 11 (Eqs. 9 to 11):

$$|\psi(\gamma, \beta)\rangle = U_{(1,p)} |+\rangle^{\otimes n}, \qquad (9)$$

$$U_{(i,j)} = \tilde{U}(\gamma_j, \beta_j) \ldots \tilde{U}(\gamma_{i+1}, \beta_{i+1}) \tilde{U}(\gamma_i, \beta_i), \qquad (10)$$

$$\tilde{U}(\gamma_\ell, \beta_\ell) = \exp\left(-i\gamma_\ell \sum_{q=1}^{n} X_q\right) \exp(-i\beta_\ell \mathcal{H}), \qquad (11)$$

is defined by the m=2p parameters in the vectors $\gamma = (\gamma_1, \ldots, \gamma_p)$ and $\beta = (\beta_1, \ldots, \beta_p)$ of a length p. In the simulation, the parameters are initialized randomly in a range [0, p]. The parameters are beneficially optimized using an analytical gradient descent. As described below, the analytical gradient for the QAOA Ansatz can also be computed using only the Ansatz circuit for various parameter sets. Beneficially, in the QAOA simulation, there is used a fixe learning rate is used for all optimization steps and partial derivatives. Optionally, a parameter $\eta = 1$ is used as being a best performing learning rate for a 5-qubit problem set from the values 1, 0.1 and 0.01.

Performance of F-VQE

Figures 5A, 5B, 5C:
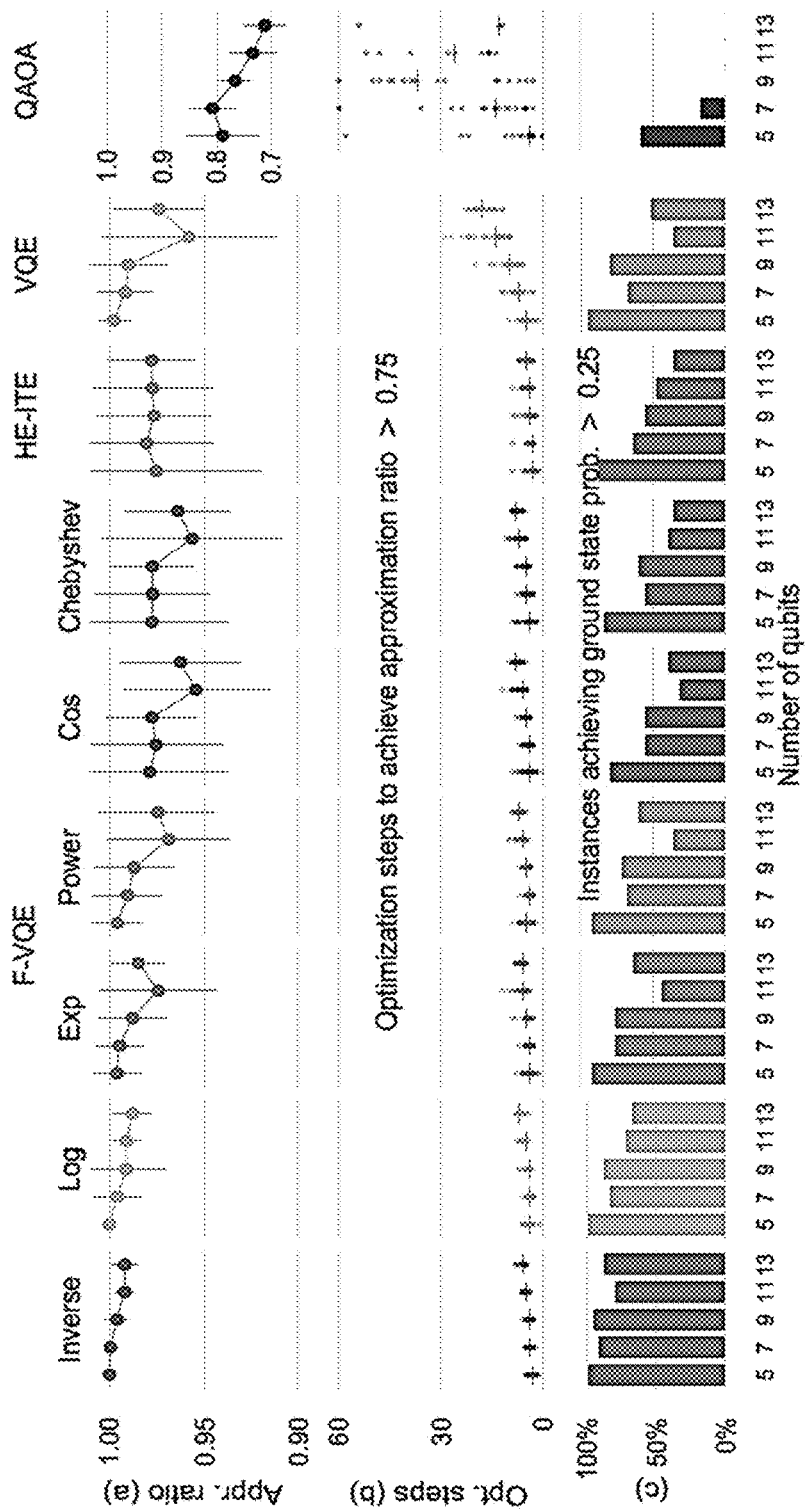
FIG. 5A shows calculated approximation ratio (circles) and standard deviation (error bars) for 25 random MaxCut problems of various sizes.
FIG. 5B shows optimization steps: median (lines) and all instances (dots) for the 25 random MaxCut problems of FIG. 5A.
FIG. 5C shows fraction of instances that achieve a probability for the 25 random MaxCut problems of FIG. 5A.

A comparison of mutually different filtering operators in the F-VQE algorithm is shown in FIG. 5. In FIGS. 5A to 5C, there is shown a simulation for twenty-five random MaxCut problems of various sizes. In FIG. 5A, there are shown average approximation ratio (circles) and standard deviation (error bars). It will be noted that there are different ranges for QAOA. In FIG. 5B, there are shown optimization steps: median (lines) and all instances (dots). The number of instances that achieve an approximation ratio of 0.75 is 25 for all algorithms and problem sizes except QAOA. For QAOA, their numbers are 17, 22, 21, 9, and 3 for increasing n. In FIG. 5C, there is shown a fraction of instances that achieve a probability of measuring the ground state above 0.25. In FIG. 5, filtering operators are sorted from left to right by performance; the inverse filter is found to be the best performing filter. In FIG. 5A, there is shown for each algorithm of the present disclosure an averaged achieved approximation ratio for each problem size. Best performing filters achieve the largest approximation ratios, as shown by the small deviation. In FIG. 5B, there is shown the distribution of the number of optimization steps required to achieve an approximation ratio above 0.75. Here, all filters achieve a mutually similar performance, wherein they require five or less optimization steps with very little deviation from the median. In FIG. 5C, there is shown the fraction of problem instances where algorithms achieve a probability of sampling the ground state above 0.25. The probability of sampling it at least once with m measurement shots is then $1-(1-0.25)^m$. The best filters achieve this critical probability on a larger fraction of instance problems.

When developing implementations of the present disclosure, it was found that F-VQE with the inverse filter successfully solved a random 9-qubit MaxCut instance from the problem set on a trapped-ion quantum processor. FIG. 1B is an illustration of the approximation ratio and the probability of measuring the ground state for each optimization step.

Figure 6A:
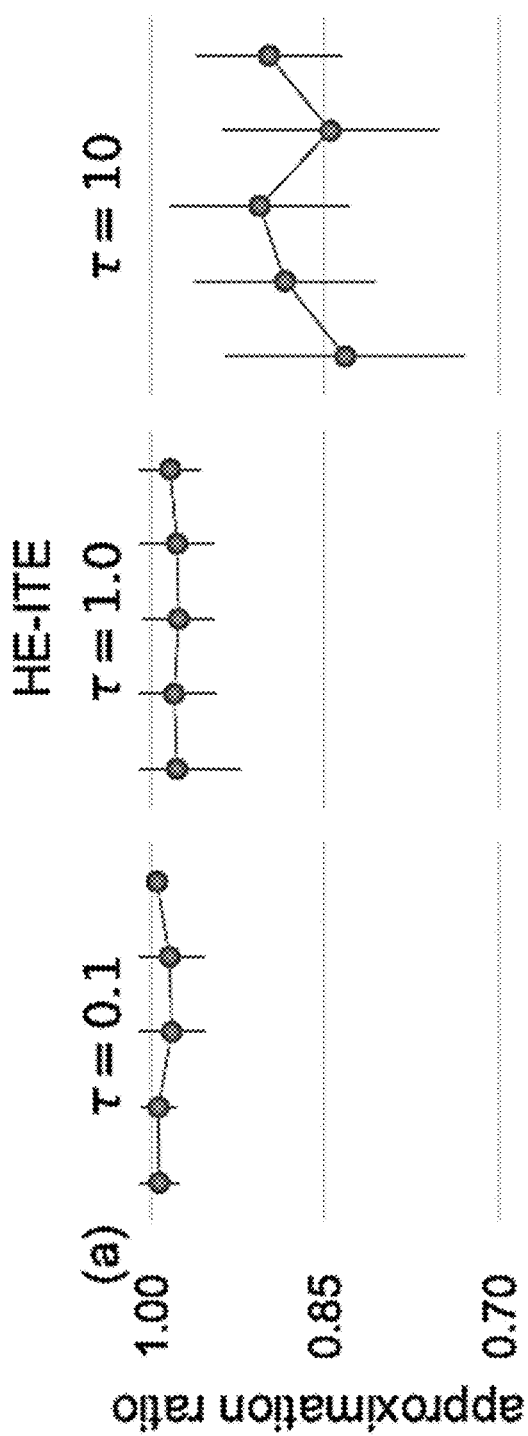
FIG. 6A shows optimization steps including median (lines) and all instances (dots), used when HE-ITE algorithm is applied to twenty-five random MaxCut problems of various sizes.
Figure 6B:
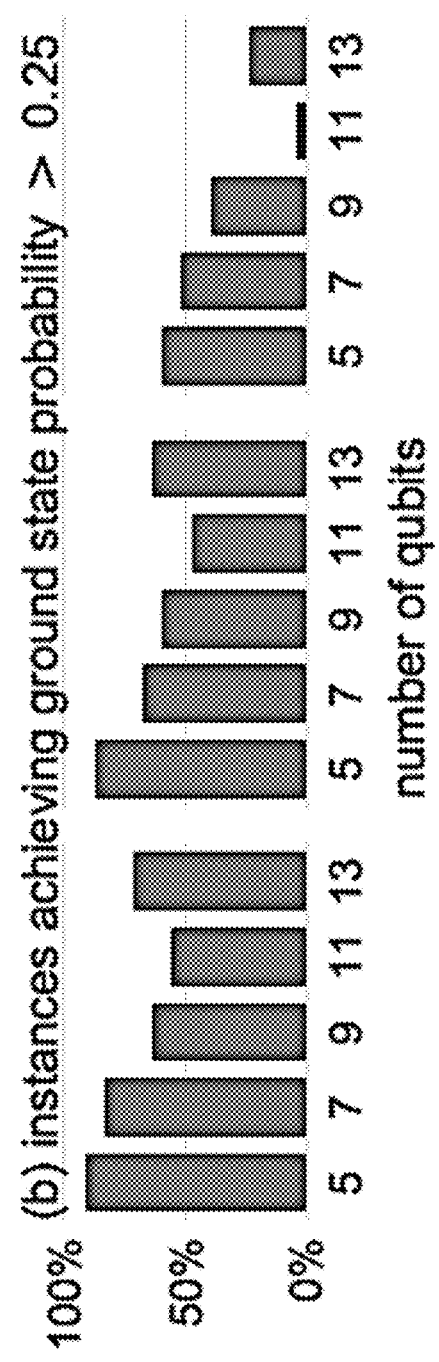
FIG. 6B shows a fraction of instances that achieve a probability of measuring the ground state above a value 0.25 when HE-ITE algorithm is applied to the twenty-five random MaxCut problems of FIG. 6A.

A comparison between F-VQE based on the best performing filtering operator—the inverse filter—with VQE and QAOA shows that F-VQE requires less optimization steps than VQE and QAOA to achieve larger and more consistent approximation ratios. This can be seen in FIGS. 5A and 5B as well as in FIG. 1A. 1(a), which shows the evolution of the average approximation with the optimization steps. Here F-VQE increases the approximation ratio faster and presents smaller deviations than VQE and QAOA. Additionally, as shown in FIG. 5C, F-VQE converges to the ground state more often for all problem sizes. The HE-ITE algorithm also achieves approximation ratios close to the optimum and converges frequently to the ground state. Moreover, the evolution of the approximation ratio shown in FIG. 1(a) almost overlaps with that for F-VQE. Similarly, in FIG. 1C the average approximation ratio for 25 problem instances of 23 qubits reaches an approximation ratio close to optimum. Importantly, the quantum circuits never use more than 6 qubits. The inset in FIG. 1C shows the average fraction of circuits for each qubit count. The performance of HE-ITE depends on the imaginary-time step τ. FIG. 6 compares for three values of τ the number of optimization steps to achieve an approximation ratio of 0:65 and the fraction of problem instances where a probability of sampling the ground state above 0:75 is achieved. In FIGS. 6A and 6B, there are shown simulation results for the HE-ITE algorithm applied to twenty-five random MaxCut problems of various sizes using different imaginary time steps t and a total imaginary 100. FIG. 6A shows optimization steps including median (lines) and all instances (dots). FIG. 6B shows a fraction of instances that achieve a probability of measuring the ground state above a value 0.25. In FIG. 6B HE-ITE with τ=0:1 and τ=1:0 converges to the ground state for a larger fraction of problem instances than with τ=10. From the three values τ=1 requires less optimization steps as shown in FIG. 6A.

It has been shown that F-VQE with the inverse filter successfully solves a random 9-qubit MaxCut instance from the problem set on the Honeywell H1 trapped-ion quantum processor. FIG. 1B shows the approximation ratio and the probability of measuring the ground state for each optimization step. The approximation ratio achieved is 0:9844_0:0062 and the probability of sampling the ground state after the final optimization step is 0:928±0:024. Here the value after ±indicates a 95% confidence interval.

CONCLUSIONS

Implementations pursuant to the present disclosure provide Variational Quantum Eigensolver algorithms that make use of filtering operators to solve combinatorial optimization problems. The F-VQE algorithm is a particularly efficient version of VQF akin to VQE. These algorithms impose no restrictions on the Ansatz circuit, so implementations of the present disclosure select an Ansatz circuit that performs optimally on quantum computing hardware, for example both when implemented on ion-trap quantum computing apparatus and also on Josephson junction gate-based quantum computing apparatus. Moreover, there is no restriction on the cost function arrangement, as long as the minimum energy state of the cost function arrangement is an eigenstate of a corresponding computational basis. The F-VQE algorithm is capable of achieving larger and more consistent approximation ratios, as well as more reliable convergence to the optimal solutions than conventional VQE and QOAO via fewer optimization steps. F-VQE is especially promising for VQE tasks to be performed on noisy intermediate-scale quantum (NISQ) computers. Owing to the high flexibility of the F-VQE algorithm, various promising strategies can be considered to improve the performance further. Optionally, local cost functions and shallow Ansatz circuits can be used to avoid barren plateaus when seeking to iterate to a solution. Optionally, the Ansatz is specifically selected to reduce, for example minimize, experimental noise on quantum computing hardware. Beneficially, there is used a classical optimizer, for example implemented using a classical (binary) computer, for the parameters for simultaneously adjusting the Ansatz circuit structure to alleviate effects of quantum computational noise. Optionally, gradient-descent techniques such as stochastic gradient descent are used to reduce the number of optimization steps required for the F-VQE algorithm and to avoid local minima when optimizing the F-VQE algorithm. Yet more optionally, mutually different heuristic adaptations of the parameter rand the learning rate are explored to gain more information from circuit samples when optimizing the F-VQE algorithm.

Optionally, the inverse filter is realized using quantum Hamiltonians by means of a Fourier approximation.

Hadamard test for QVF

Figure 7:
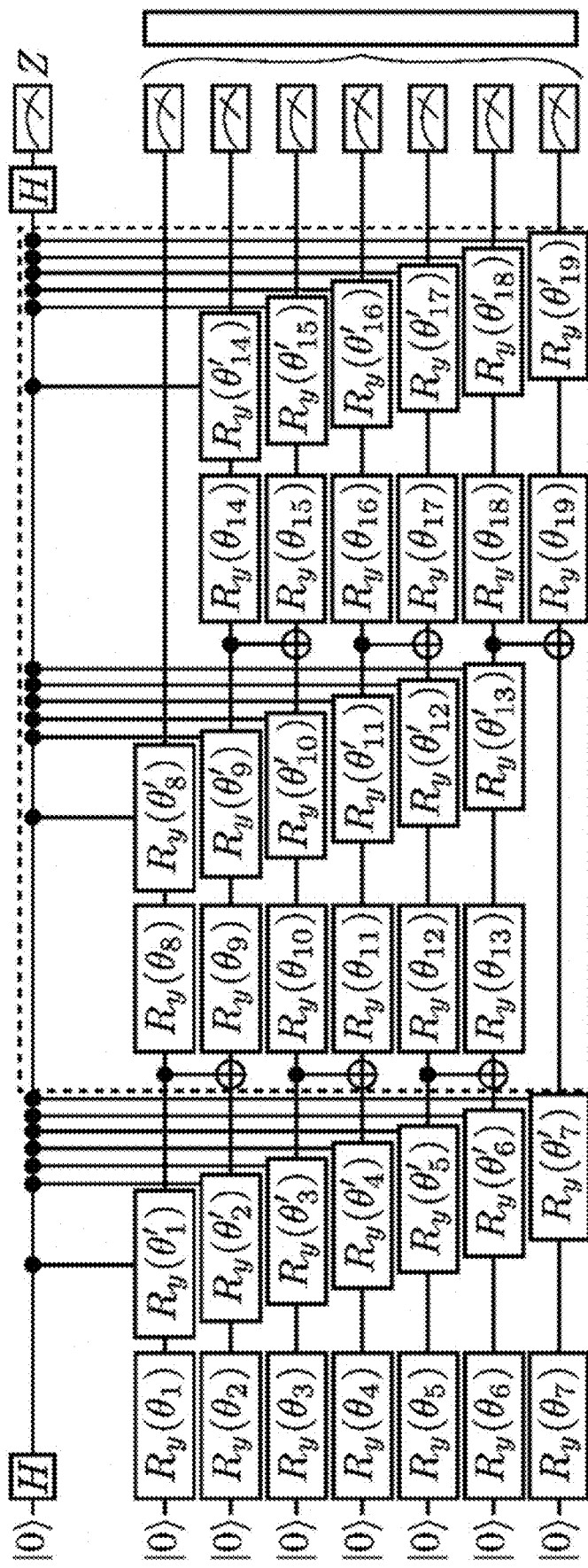
FIG. 7 illustrates a Hadamard test circuit for computing Re $\langle \varphi(\phi)|F_\tau|\psi(\theta)\rangle$ for the parameterized quantum circuit in FIG. 4A.

In this section, there is described how to reduce, for example to minimize, the QVF cost function Equation 4 (Eq. 4) by using a Hadamard test. Evaluating the cost function Eq. 4 requires computing a quantity of a form $\langle (\phi)|F_t|\psi(\theta) \rangle$, wherein $|\psi(\theta)\rangle$ and $|\psi(\phi)\rangle$ are n-qubit quantum Ansatz circuits illustrated in FIG. 4A with parameter vectors θ and ϕ. The computation of such a quantity is also needed for the gradient calculation in Eq. 5 for any θ. This quantity can be computed using a Hadamard test by evaluating the expectation value of the diagonal and Hermitian observable $Z_a \otimes (F_t)_r$ with the specific circuit $W(\theta,\phi)$ in FIG. 7. In FIG. 7, there is shown a Hadamard test circuit to compute Re $\langle \psi(\phi)|F_t|\psi(\theta) \rangle$ for the parameterized quantum circuit in FIG. 4A. The H gates on the ancilla qubit indicate Hadamard gates. For an Ansatz of p layers, the block of gates inside the dashed rectangle is applied p times. FIG. 7 is an illustration for p=1 layer. Parameter vectors satisfy θ'=ϕ−θ. The specific circuit comprises a n-qubit register and one ancilla qubit labelled "a". Moreover, the specific circuit implements the following operation in Equation A1 (Eq. A1):

$$W(\theta, \phi)|0\rangle_a \otimes |0\rangle_r = \frac{1}{2}|0\rangle_a(|\psi(\theta)\rangle + |\psi(\phi)\rangle) + \frac{1}{2}|1\rangle_a(|\psi(\theta)\rangle - |\psi(\phi)\rangle). \quad (A1)$$

Analytical Derivatives

In this section, there is derived the analytical gradient in Eq. 5 and the diagonal elements of the Hessian matrix for the cost function Eq. 4 corresponding to the QVF algorithm. There is used a parameter-shift rule to derive the analytical gradient in Eq. 6 for the F-VQE algorithm. This rule is also susceptible to being used to derive analytical gradients for VQE and QAOA algorithms.

QVF and F-QVE Algorithms

In the quantum Ansatz circuits $|\psi(\theta)\rangle$ as illustrated in FIG. 4, parameters $\theta=(\theta_1, \theta_2, \ldots, \theta_m)$ are present only in rotation gates of a form $R_G(\theta_i)=\exp(-\theta_i G/2)$, wherein G is a single-qubit Pauli operator or a tensor product of Pauli operators. As a function of a single parameter, the quantum circuit can be expressed in terms of two fixed unitaries $V_A$, $V_B$ and the rotation gates correspond to a parameter as provided in Equation B1 (Eq. B1):

$$|\psi(\theta_i)\rangle = V_A R_G(\theta_i) V_B |0\rangle, \quad (B1)$$

wherein $|0\rangle = |0\rangle^{\otimes n}$ is an initial state of a register. Hence, the first and second derivatives with respect to a parameter $\theta_i$ are given in Equations B2 and B3 (Eqs. B2, B3):

$$\frac{\partial |\psi(\theta_i)\rangle}{\partial \theta_i} = \frac{1}{2} V_A R_G(\theta_i)(-iG) V_B |0\rangle = \frac{1}{2} |\psi(\theta_i + \pi)\rangle \quad (B2)$$

$$\frac{\partial^2 |\psi(\theta_i)\rangle}{\partial \theta_i^2} = \frac{1}{4} V_A R_G(\theta_i)(-iG)^2 V_B |0\rangle = -\frac{1}{4} |\psi(\theta_i)\rangle, \quad (B3)$$

wherein $-iG=R_G(\pi)$. Then, first and second derivatives of cost function Eq. 4 result in Equations B4 and B5 (Eqs. B4, B5):

$$\frac{\partial C_t(\theta)}{\partial \theta_i} = -\frac{\text{Re}\langle\psi_{t-1}|F_t|\psi(\theta + \pi e_i)\rangle}{2\sqrt{\langle F_t^2\rangle_{\psi_{t-1}}}}, \qquad (B4)$$

$$\frac{\partial^2 C_t(\theta)}{\partial \theta_i^2} = \frac{\text{Re}\langle\psi_{t-1}|F_t|\psi(\theta)\rangle}{4\sqrt{\langle F_t^2\rangle_{\psi_{t-1}}}}. \qquad (B5)$$

The first equation (Eq. B4) corresponds to Eq. 5. Since the filtering operator $F_t$ is Hermitian, when the first equation Eq. B4 is evaluated on the vector of parameters $\theta_{t-1}$ that produces the state $|\psi_{t-1}\rangle = |\psi(\theta_{t-1})\rangle$, it is feasible to use parameter parameter-shift rule to express the numerator as a sum of two quantum circuits, thereby obtaining Equation 6 (Eq. 6). When the second equation is evaluated on $\theta_{t-1}$, the second equation results in:

$$\frac{\partial^2 C_t(\theta)}{\partial \theta_i^2}\bigg|_{\theta_{t-1}} = \frac{\langle F_t\rangle_{\psi_{t-1}}}{4\sqrt{\langle F_t^2\rangle_{\psi_{t-1}}}} \qquad (B6)$$

which can be evaluated from the circuit $|\psi_{t-1}\rangle$ only.

VQE

The cost function is the average energy $\langle \mathcal{H} \rangle \psi(\theta)$, and the Ansatz circuit $|\psi(\theta)\rangle$ is the same as used by F-VQE in FIG. 4A. Given that each parameter is present in only one rotation gate, the parameter-shift rule can be applied to express the analytical gradient as provided in Equation B7 (Eq. B7):

$$\frac{\partial \langle\mathcal{H}\rangle_{\psi(\theta)}}{\partial \theta_i}\bigg|_{\theta_{i-1}} = \frac{1}{2}\left(\langle\mathcal{H}\rangle_{\psi_{i-1}^{i+}} - \langle\mathcal{H}\rangle_{\psi_{i-1}^{i-}}\right). \qquad (B7)$$

In a similar manner as for F-VQE, the circuits $$|\psi_{t-1}^{i\pm}\rangle \equiv \left|\psi\left(\theta_{t-1} \pm \frac{\pi}{2}e_i\right)\right\rangle$$

are implemented by shifting the parameter $\theta_i$ by an amount $\pm\pi/2$.

QAOA

The ansatz in Eq. 9 is not of a previous form. In Eq. 9, parameters multiply sums of tensor products of Pauli operators, so that the partial derivatives become sums. Given a Hamiltonian $\mathcal{H} = \Sigma_{k=1}^K h_k Z_{Qk}$, with $Z_{Qk} = \otimes_{q \in Q_k} Z_q$ and real coefficient $h_k$, the Ansatz derivatives are provided in Equations B8 and B9 (Eqs. B8, B9):

$$\frac{\partial |\psi(\gamma_i \beta)\rangle}{\partial \gamma_i} = \sum_{q=1}^n U_{(l,t-1)}(-iX_q)U_{(i,p)}|+\rangle^{\otimes n}, \qquad (B8)$$

$$\frac{\partial |\psi(\gamma_i \beta)\rangle}{\partial \beta_i} = \sum_{k=1}^K h_k U_{(l,i)}(-iZ_{Q_k})U_{(i+1,p)}|+\rangle^{\otimes n}. \qquad (B9)$$

Therefore, the partial derivatives of the QAOA cost function become:

$$\frac{\partial \langle\mathcal{H}\rangle_{\psi(\gamma,\beta)}}{\partial \gamma_i} = 2\sum_{q=1}^n \text{Re}\langle\psi(\gamma,\beta)|\mathcal{H}\frac{\partial |\psi(\gamma,\beta)\rangle}{\partial \gamma_i}, \qquad (B10)$$

$$\frac{\partial \langle\mathcal{H}\rangle_{\psi(\gamma,\beta)}}{\partial \beta_i} = 2\sum_{k=1}^K h_k \text{Re}\langle\psi(\gamma,\beta)|\mathcal{H}\frac{\partial |\psi(\gamma,\beta)\rangle}{\partial \beta_i}. \qquad (B11)$$

If the parameter-shift rule is applied to every term individually, we obtain the analytical gradient for the QAOA Ansatz in terms of Ansatz circuits for various parameter sets:

$$\frac{\partial \langle\mathcal{H}\rangle_{\psi(\gamma,\beta)}}{\partial \gamma_i} = \sum_{q=1}^n \left(\langle\mathcal{H}\rangle_{\psi_X^{(i,q)+}} - \langle\mathcal{H}\rangle_{\psi_X^{(i,q)-}}\right), \qquad (B12)$$

$$\frac{\partial \langle\mathcal{H}\rangle_{\psi(\gamma,\beta)}}{\partial \beta_i} = \sum_{k=1}^K h_k\left(\langle\mathcal{H}\rangle_{\psi_{\mathcal{H}}^{(i,k)+}} - \langle\mathcal{H}\rangle_{\psi_{\mathcal{H}}^{(i,k)-}}\right). \qquad (B13)$$

Evaluating all gradient components requires the following 2pn quantum circuits and 2pK quantum circuits defined by inserting a rotation quantum gate in the Ansatz circuit:

$$|\psi_X^{(i,q)\pm}\rangle = U_{(l,i-1)}R_{X_q}\left(\pm\frac{\pi}{2}\right)U_{(i,p)}|+\rangle^{\otimes n}, \qquad (B14)$$

$$|\psi_{\mathcal{H}}^{(i,k)\pm}\rangle = U_{(l,i)}R_{Z_{Q_k}}\left(\pm\frac{\pi}{2}\right)U_{(i+1,p)}|+\rangle^{\otimes n}. \qquad (B15)$$

MaxCut Problems

This section provides further details on the MaxCut problems used in example implementations of the present disclosure to test the performance of various algorithms. The MaxCut problems used are defined on weighted simple undirected and connected graphs $\mathcal{G}$ ($\mathcal{V}$, $\mathcal{E}$, $\mathcal{W}$) represented by a set $\mathcal{V} = \{i, j, \ldots\}$ nodes, wherein a set $\mathcal{E} \subset \{\{i,j\} \in \mathcal{V} \times \mathcal{V}, i \neq j\}$ of edges is used between nodes pairs and a set $\mathcal{V} = \{w_c \in [0, 1] | c \in \mathcal{E}\}$ of weights is used for each edge. A computational task involves finding an optimal cut, namely a separation of the nodes into two disjoint subsets such that the weight sum of the edges subsets is maximised. Any cut can be represented by a binary vector of length $|\mathcal{V}|$ that assigns 0 to the nodes in one subset and 1 to the nodes in another subset. Such a formulation has a symmetry of swapping labels 0, 1 for the two subsets. The symmetry can be broken by assigning 0 to the first nodes i=1. Such breaking of the symmetry reduces the number of binary variable of the problem to $n = |\mathcal{V}| - 1$. Thereafter, a solution to the MaxCut problem involves solving a binary optimization problem as provided in Equation C1:

$$\underset{x}{\text{argmax}} \sum_{c=\{1,j\}\in\mathcal{E}} w_c x_j + \sum_{c=\{i\neq1,j\}\in\mathcal{E}} w_c(x_i - x_j)^2. \qquad (C1)$$

Since the cost function above is a sum of positive terms, a minimum cost is 0 and corresponds to all binary variables $x_i = 0$. Moreover, the Hamiltonian formulation of the problem is obtained by taking the negative of the cost function above and replacing each binary variable $x_i$ by a projector $(I - Z_i)/2$ onto a qubit i. Consequently, the maximum energy is 0 and corresponds to the computational state $|0\rangle^{\otimes n}$.

Example Embodiments

Some additional nonlimiting examples of embodiments discussed above are provided below. These should not be read as limiting the breadth of the disclosure in any way.

Example 1: A computing system configured to perform at least one combinatorial optimization task, the computing system comprising:
one or more quantum computers; and
one or more classical binary computers coupled to the one or more quantum computers,
wherein the one or more classical binary computers are configured to:
receive one or more computing tasks including the at least one combinatorial optimization task, via an input port;
configure the one or more quantum computers based at least in part on the one or more computing tasks;
generate computational results using output results received from the one or more quantum computers; and
output the computational results via an output port,
wherein the one or more quantum computers are configured to execute one or more quantum circuits that are generated from the one or more computing tasks to generate the output results,
wherein the computing system is configured to generate and configure the one or more quantum circuits using a Filtering Variation Quantum Eigensolver (F-VQE) algorithm implemented based at least in part on one or more Ansätze circuits and a filtered cost function arrangement;
wherein the computing system is configured to apply iteratively a filtering operator to a cost function arrangement to generate the filtered cost function arrangement that excludes one or more energy states of the cost function arrangement that exceed an energy threshold and retains one or more energy states of the cost function arrangement that are below the energy threshold.

Example 2: The computing system of example 1, wherein the one or more classical binary computers are configured to compute one or more causal cones that are representative of one or more principal computation paths within the one or more quantum circuits that contribute to the output results, and wherein the one or more classical binary computers are configured to omit one or more parts of the one or more quantum circuit whose contribution to the output results are below a threshold value.

Example 3: The computing system of example 2, wherein omitting the one or more parts corresponds to a reduction in a number of qubits and gates required to implement the one or more quantum circuits.

Example 4: The computing system of example 2, wherein omitting the one or more parts corresponds to a reduction in circuit depth of the one or more quantum circuits.

Example 5: The computing system of example 1, wherein a repeated action of the filtering operator on an initial quantum state projects out corresponding high-energy eigenstates and generates a resulting quantum state having a larger overlap with a ground state, wherein the initial quantum state corresponds to sub-optimal solutions to at least one combinatorial optimization task.

Example 6: The computing system of example 1, wherein the computing system is configured to compute a stochastic gradient descent when applying the filtering operator to the cost function arrangement to reduce a number of optimization steps required for minimizing energy expectation value of a corresponding quantum state, and to avoid local minima during optimization.

Example 7: The computing system of example 1, wherein after iterative applications of the filtering operator on the cost function, the filtered cost function arrangement enables convergence to a ground state for the one or more quantum circuits using fewer optimization steps.

Example 8: The computing system of example 1, wherein at least a subset of the one or more quantum computers is implemented using trapped ion quantum processors.

Example 9: A method for using a computing system including one or more classical binary computers coupled to one or more quantum computers to perform at least one combinatorial optimization task, the method comprising:
by a hardware processor of the one or more classical binary computers:
receiving one or more computing tasks via an input port of the one or more classical binary computers;
configuring the one or more quantum computers based at least in part on the one or more computing tasks by generating one or more quantum circuits based on a Filtering Variational Quantum Eigensolver (F-VQE) algorithm, wherein the F-VQE algorithm is implemented based at least in part on one or more Ansätze circuits and a filtered cost function arrangement;
executing the one or more quantum circuits to generate output results;
generating computational results using the output results received from the one or more quantum computers;
outputting the computational results via an output port of the one or more classical binary computers;
wherein executing the one or more quantum circuits comprises applying iteratively a filtering operator to a cost function arrangement to generate the filtered cost function arrangement that excludes one or more energy states of the cost function arrangement that exceed an energy threshold and to retain one or more energy states of the cost function arrangement that are below the energy threshold, and wherein the filtered cost function arrangement is used in the one or more quantum circuits to generate the output results.

Example 10: The method of example 9, further comprising configuring the one or more classical binary computers to compute one or more causal cones that are representative of one or more principal computation paths within the one or more quantum circuits that contribute to the output results, and wherein the one or more classical binary computers are configured to omit one or more parts of the one or more quantum circuit whose contribution to the output results are below a threshold value.

Example 11: The method of example 10, further comprising omitting the one or more parts corresponds to a reduction in a number of qubits required to implement the one or more quantum circuits.

Example 12: The method of example 11, wherein omitting the one or more parts corresponds to a reduction in circuit depth of the one or more quantum circuits.

Example 13: The method of example 9, wherein applying iteratively the filtering operator to the cost function projects out high-energy eigenstates of a corresponding quantum state, wherein the high-energy eigenstates correspond to sub-optimal solutions to the at least one combinatorial optimization task.

Example 14: The method of example 9, further comprising computing a stochastic gradient descent when applying iteratively the filtering operator to the cost function arrangement, to reduce a number of optimization steps required for generating the filtered cost function arrangement, and to avoid local minima during the optimization.

Example 15: The method of example 9, wherein after iterative applications of the filtering operator, the filtered cost function arrangement enables a ground state for the one or more quantum circuits to be computed.

Example 16: The method of example 9, wherein at least a subset of the one or more quantum computers is implemented using trapped ion quantum processors.

Example 17: A machine-readable data storage medium comprising specific instructions that is executable on a data processing hardware of the computing system to implement the method of example 9.

Example 18: The computing system of example 1, wherein after iterative applications of the filtering operator on the cost function, the resulting filtered cost function is used to compute the smallest energy expectation value of associated with the one or more quantum circuits.

Example 19: The computing system of example 1, wherein the Ansätze circuits comprise at least one parametrized quantum circuit.

Example 20: The computing system of example 1, wherein the filtering operator comprises areal-valued function (f) of a Hamiltonian associated with the combinatorial optimization task and a scalar parameter, and wherein $f^2$ is a strictly decreases with energy.

Example 21: The computing system of example 1, wherein at least a subset of the one or more quantum computers is implemented using superconducting quantum processors.

Example 22: The computing system of example 1, wherein at least a subset of the one or more quantum computers is implemented using photonic quantum processors.

Terminology

Modifications to embodiments of the disclosure described in the foregoing are possible without departing from the scope of the disclosure as defined by the accompanying claims. Expressions such as "including", "comprising", "incorporating", "have", "is" used to describe and claim the disclosure are intended to be construed in a non-exclusive manner, namely allowing for items, components or elements not explicitly described also to be present.

Reference to the singular is also to be construed to relate to the plural; as an example, "at least one of" indicates "one of" in an example, and "a plurality of" in another example; moreover, "one or more" is to be construed in a likewise manner.

Reference to the singular is also to be construed to relate to the plural. The word "exemplary" is used herein to mean "serving as an example, instance or illustration". Any embodiment described as "exemplary" is not necessarily to be construed as preferred or advantageous over other embodiments or to exclude the incorporation of features from other embodiments. The word "optionally" is used herein to mean "is provided in some embodiments and not provided in other embodiments". It is appreciated that certain features of the disclosure, which are, for clarity, described in the context of separate embodiments, may also be provided in combination in a single embodiment. Conversely, various features of the invention, which are, for brevity, described in the context of a single embodiment, may also be provided separately or in any suitable combination or as suitable in any other described embodiment of the disclosure.

The phrases "in an embodiment", "according to an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The term "computer" or "computing-based device" is used herein to refer to any device with processing capability such that it executes instructions. Those skilled in the art will realize that such processing capabilities are incorporated into many different devices and therefore the terms "computer" and "computing-based device" each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible, non-transitory storage medium, e.g., in the form of a computer program comprising computer program code adapted to perform the operations of one or more of the methods described herein when the program is run on a computer and where the computer program may be embodied on a non-transitory computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. No single feature or group of features is necessary or indispensable to every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, blocks, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A; B; C; A and B; A and C; B and C; and A, B, and C. Conjunctive language such as the phrase "at least one of X, Y, and Z," unless specifically stated otherwise, is otherwise understood with the context as used in general to convey that an item, term, etc. may be at least one of X, Y, or Z. Thus, such conjunctive language is not generally intended to imply that certain embodiments require at least one of X, at least one of Y, and at least one of Z to each be present.

The operations of the methods described herein may be carried out in any suitable order, or simultaneously where appropriate. Additionally, individual blocks may be deleted from, combined with other blocks, or rearranged in any of the methods without departing from the scope of the subject matter described herein. Aspects of any of the examples described above may be combined with aspects of any of the other examples described to form further examples without losing the effect sought.

It will be understood that the above description is given by way of example only and that various modifications may be made by those skilled in the art. The above specification, examples, and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A computing system configured to perform at least one combinatorial optimization task, the computing system comprising:
   one or more quantum computers; and
   one or more classical binary computers coupled to the one or more quantum computers,
   wherein the one or more classical binary computers are configured to:
     receive one or more computing tasks including the at least one combinatorial optimization task, via an input port of the one or more classical binary computers;
     generate a filtered cost function arrangement using a filtering operator;
     configure the one or more quantum computers based at least in part on the one or more computing tasks and the filtered cost function arrangement;
     generate computational results using output results received from the one or more quantum computers; and
     output the computational results via an output port of the one or more classical binary computers;
   wherein the one or more quantum computers are configured to execute one or more quantum circuits to generate the output results,
   wherein the computing system is configured to generate and configure the one or more quantum circuits using a Filtering Variation Quantum Eigensolver (F-VQE) algorithm implemented based at least in part on one or more Ansätze circuits and the filtered cost function arrangement, and
   wherein the computing system is configured to generate the computational results by applying the filtering operator to increase a probability of sampling of eigenstates having lower energies.

2. The computing system of claim 1, wherein the one or more classical binary computers are configured to compute one or more causal cones that are representative of one or more principal computation paths within the one or more quantum circuits that contribute to the output results, and wherein the one or more classical binary computers are configured to omit one or more parts of the one or more quantum circuit whose contribution to the output results are below a threshold value.

3. The computing system of claim 2, wherein omitting the one or more parts corresponds to a reduction in a number of qubits and gates required to implement the one or more quantum circuits.

4. The computing system of claim 2, wherein omitting the one or more parts corresponds to a reduction in circuit depth of the one or more quantum circuits.

5. The computing system of claim 1, wherein applying the filtering operator on an initial quantum state projects out corresponding high-energy eigenstates and generates a resulting quantum state having a larger overlap with a ground state, wherein the high-energy eigenstates correspond to sub-optimal solutions to the at least one combinatorial optimization task.

6. The computing system of claim 1, wherein applying the filtering operator computing a stochastic gradient descent.

7. The computing system of claim 1, wherein applying the filtering operator causes the filtered cost function arrangement to converge to a ground state using fewer optimization steps compared to applying a Variational Quantum Eigensolver (VQE) or applying a Quantum Approximate Optimization Algorithm (QAOA).

8. The computing system of claim 1, wherein at least a subset of the one or more quantum computers is implemented using trapped ion quantum processors.

9. The computing system of claim 1, wherein the filtered cost function is used to compute the smallest energy expectation value associated with the one or more quantum circuits.

10. The computing system of claim 1, wherein the Ansätze circuits comprise at least one parametrized quantum circuit.

11. The computing system of claim 1, wherein the filtering operator comprises a real-valued function (f) of a Hamiltonian associated with the combinatorial optimization task and a scalar parameter, and wherein the square of the real-valued function ($f^2$) strictly decreases with energy.

12. The computing system of claim 11, wherein the real-valued function (f) is selected from a group containing: inverse function, logarithm, exponential, power, cosine, or Chebyshev.

13. The computing system of claim 10, wherein an action of the filtering operator is approximated by successively optimizing variation parameters of a parameterized quantum circuit.

14. A method for using a computing system including one or more classical binary computers coupled to one or more quantum computers to perform at least one combinatorial optimization task, the method comprising:
by a hardware processor of the one or more classical binary computers:
receiving one or more computing tasks via an input port of the one or more classical binary computers;
generate a filtered cost function arrangement using a filtering operator;
configuring the one or more quantum computers based at least in part on the one or more computing tasks by generating one or more quantum circuits based on a Filtering Variational Quantum Eigensolver (F-VQE) algorithm, wherein the F-VQE algorithm is implemented based at least in part on one or more Ansätze circuits and the filtered cost function arrangement;
executing the one or more quantum circuits to generate output results;
generating computational results using the output results received from the one or more quantum computers;
outputting the computational results via an output port of the one or more classical binary computers;
wherein executing the one or more quantum circuits comprises applying the filtering operator to increase a probability of sampling eigen states having lower energies, and
wherein the filtered cost function arrangement is used in the one or more quantum circuits to generate the output results.

15. The method of claim 14, further comprising configuring the one or more classical binary computers to compute one or more causal cones that are representative of one or more principal computation paths within the one or more quantum circuits that contribute to the output results, and wherein the one or more classical binary computers are configured to omit one or more parts of the one or more quantum circuit whose contribution to the output results are below a threshold value.

16. The method of claim 15, further comprising omitting the one or more parts corresponds to a reduction in a number of qubits required to implement the one or more quantum circuits.

17. The method of claim 16, wherein omitting the one or more parts corresponds to a reduction in circuit depth of the one or more quantum circuits.

18. The method of claim 14, wherein applying the filtering operator projects out corresponding high-energy eigenstates of a corresponding quantum state, wherein the high-energy eigenstates correspond to sub-optimal solutions to the at least one combinatorial optimization task.

19. The method of claim 14, wherein applying the filtering operator comprises computing a stochastic gradient descent.

20. The method of claim 14, wherein applying the filtering operator causes the filtered cost function arrangement to converge to a ground state using fewer optimization steps compared to Variational Quantum Eigensolver (VQE) Quantum or Approximate Optimization Algorithm (QAOA).

21. The method of claim 14, wherein at least a subset of the one or more quantum computers is implemented using trapped ion quantum processors.

22. A machine-readable data storage medium comprising specific instructions that is executable on a data processing hardware of the computing system to implement the method of claim 14.

* * * * *